(12) United States Patent
Pedretti et al.

(10) Patent No.: US 12,196,170 B2
(45) Date of Patent: Jan. 14, 2025

(54) SYSTEM FOR GENERATING ELECTRICITY FROM AN UNDERWATER OCEAN STREAM

(71) Applicant: Energy Vault, Inc., Westlake Village, CA (US)

(72) Inventors: Andrea Pedretti, Thousand Oaks, CA (US); Ehsan Kharazmi, Providence, RI (US); Ares Rosakis, Altadena, CA (US); George Karniadakis, Newton, MA (US); Michael Triantafyllou, Belmont, MA (US); Phillip Rosenberg, Marina Del Rey, CA (US)

(73) Assignee: Energy Vault, Inc, Westlake Village, CA (US)

( * ) Notice: Subject to any disclaimer, the term of this patent is extended or adjusted under 35 U.S.C. 154(b) by 0 days.

(21) Appl. No.: 18/433,018

(22) Filed: Feb. 5, 2024

(65) Prior Publication Data

US 2024/0263605 A1 Aug. 8, 2024

Related U.S. Application Data

(60) Provisional application No. 63/483,713, filed on Feb. 7, 2023.

(51) Int. Cl.
*F03B 13/10* (2006.01)
*F03B 17/06* (2006.01)

(52) U.S. Cl.
CPC .............. *F03B 13/10* (2013.01); *F03B 17/06* (2013.01); *F05B 2220/706* (2013.01); *F05B 2240/95* (2013.01)

(58) Field of Classification Search
CPC .... F03B 13/10; F03B 17/06; F05B 2220/706; F05B 2240/95
(Continued)

(56) References Cited

U.S. PATENT DOCUMENTS 7,291,936 B1 11/2007 Robson
8,723,360 B2 5/2014 Hopewell
(Continued)

FOREIGN PATENT DOCUMENTS

CN 103742338 A * 4/2014
WO WO 2015/090414 A1 6/2015

OTHER PUBLICATIONS

Aimix Group Co., Ltd, "Friction Winch", AICRANE, Oct. 14, 2022, https://winchmachines.com/friction-winch/, printed Feb. 28, 2024, 14 pages.
(Continued)

*Primary Examiner* — Charles Reid, Jr.
(74) *Attorney, Agent, or Firm* — Knobbe Martens Olson & Bear, LLP

(57) ABSTRACT

A system for generating electricity from an underwater stream for generating electricity for the electric grid or for producing hydrogen includes an underwater turbine. The underwater turbine includes an upper pontoon, a lower pontoon, and a pylon structure that extends between and interconnects the upper pontoon and the lower pontoon. The underwater turbine also includes a single propeller assembly rotatably coupled to the lower pontoon. Rotation of the propeller operates a generator to generate electricity. The underwater turbine can be moored to a sea floor via a mooring weight. An optional friction winch is operable to raise or lower the underwater turbine relative to the sea floor.

17 Claims, 26 Drawing Sheets

(58) Field of Classification Search
USPC .................................. 290/43, 42, 53, 54
See application file for complete search history.

(56) References Cited

U.S. PATENT DOCUMENTS

| | | | | |
|---|---|---|---|---|
| 9,890,762 | B2* | 2/2018 | McManus | F04B 17/06 |
| 2009/0230686 | A1* | 9/2009 | Catlin | F03B 13/264 |
| | | | | 290/54 |
| 2010/0232962 | A1* | 9/2010 | Bolin | F03B 17/061 |
| | | | | 416/169 R |
| 2010/0326343 | A1* | 12/2010 | Hunt | B63B 21/50 |
| | | | | 114/293 |
| 2010/0327583 | A1* | 12/2010 | Hunt | B63B 21/50 |
| | | | | 290/43 |
| 2016/0047354 | A1* | 2/2016 | Bolin | H02K 7/1823 |
| | | | | 29/596 |
| 2021/0131397 | A1 | 5/2021 | Ishida et al. | |

OTHER PUBLICATIONS

Alshemaimry, "Tech company working with FAU shows that electrical power can be captured from the current of the Gulf Stream", The Invading Sea, Jul. 27, 2020, https://www.theinvadingsea.com/2020/07/27/tech-company-working-with-fau-shows-that-electrical-power-can-be-captured-from-the-current-of-the-gulf-stream/, printed Feb. 28, 2024, 7 pages.

Augliere, "Testing Marine Turbines", Florida Atlantic University, 2020, https://www.fau.edu/owl-research-and-innovation/fall-2021/testing-marine-turbines/, printed Feb. 28, 2024, 5 pages.

Haas, "Assessment of Energy Production Potential from Ocean Currents along the United States Coastline", Georgia Tech Research Corporation, Sep. 15, 2013, https://www.energy.gov/eere/water/articles/assessment-energy-production-potential-ocean-currents-along-united-states-0, 66 pages.

IHI Corporation, "IHI Demonstrated the World's Largest Ocean Current Turbine for the First Time in the World", IHI Engineering Review, 2019, vol. 52, No. 1, https://www.ihi.co.jp/var/ezwebin_site/storage/original/application/5a7bd9898dee90868aa1e1e085beb50b.pdf, 4 pages.

Li et al., "The economics of electricity generation from Gulf Stream currents", Elsevier, Sep. 1, 2017, vol. 134, pp. 649-658 https://www.sciencedirect.com/science/article/abs/pii/S0360544217310423, printed Feb. 22, 2024, 10 pages.

Office of Energy Efficiency & Renewable Energy, "U.S. Department of Energy Invests Nearly $10 Million to Advance Marine Energy", energy.gov, Jun. 26, 2023, https://www.energy.gov/eere/articles/us-department-energy-invests-nearly-10-million-advance-marine-energy, printed Feb. 28, 2024, 5 pages.

Pittman, "Capturing the green energy of the deep blue sea", The Washington Post, Jun. 9, 2020 https://www.washingtonpost.com/climate-solutions/2020/06/09/capturing-green-energy-deep-blue-sea/, printed Feb. 22, 2024, 6 pages.

Robichaud et al., "Marine Hydrokinetic Resource Assessment for Domestic Army, Air Force, and Coast Guard Facilities", National Renewalble Energy Laboratory NREL, Apr. 2018, https://www.nrel.gov/docs/fy18osti/70519.pdf, 2024, 114 pages.

Hasankhani et al., Modeling and numerical simulation of buoyancy controlled ocean current turbine. International Marine Energy Journal. Jul. 2021;4(2): 47-58.

International Search Report and Written Opinion mailed Jun. 27, 2024 in related Application No. PCT/US2024/014440; 13 pages.

* cited by examiner

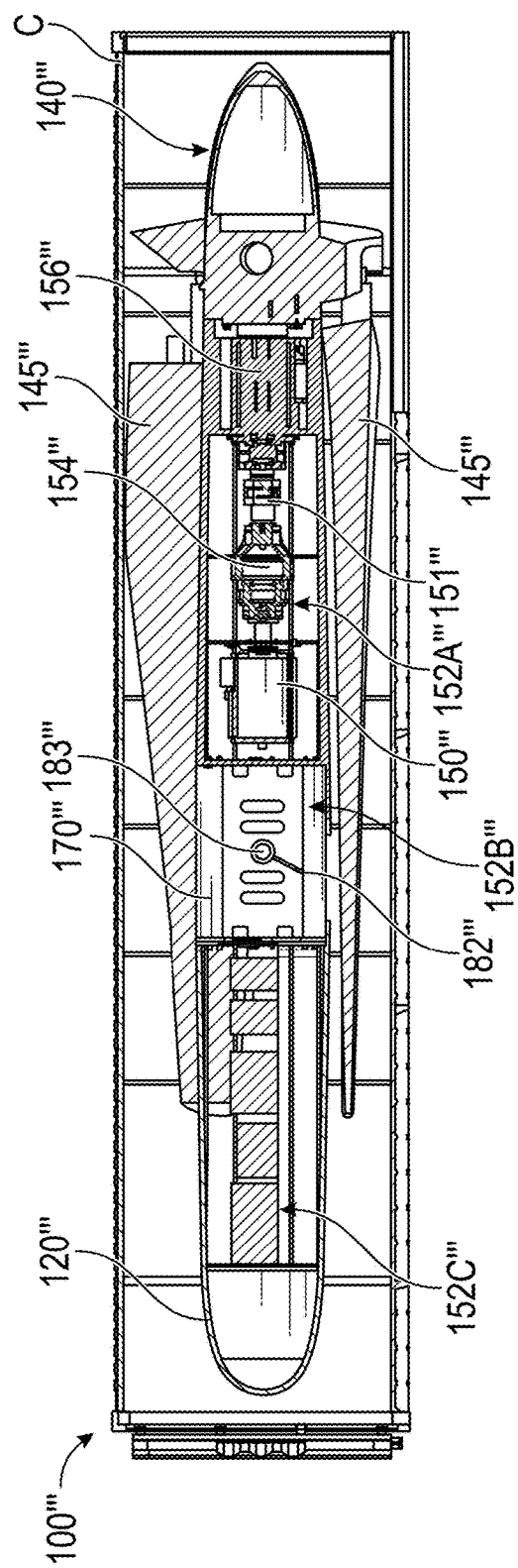
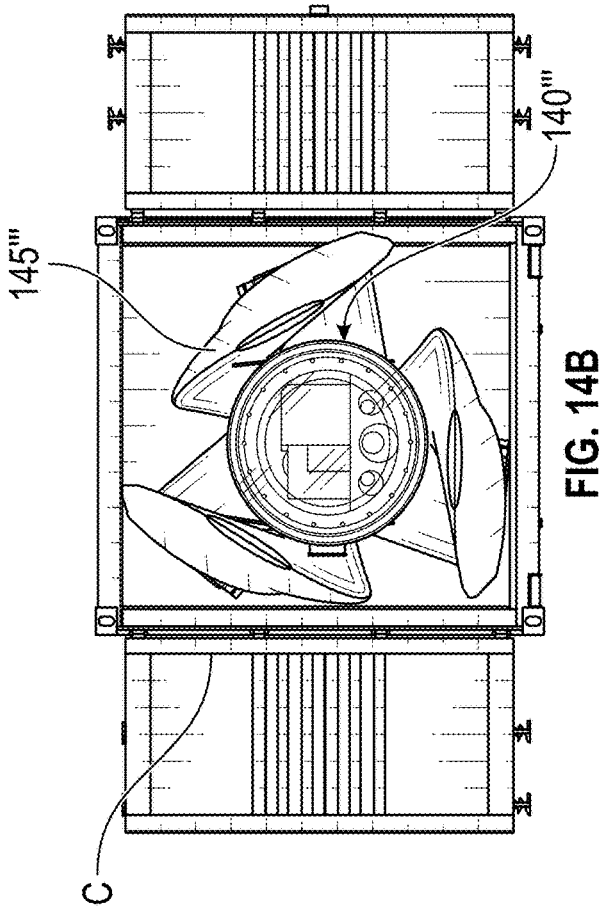
FIG. 14A
FIG. 14B

SYSTEM FOR GENERATING ELECTRICITY FROM AN UNDERWATER OCEAN STREAM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to systems and methods for generating electricity from a renewable energy source, and more particularly to a system for generating electricity from an underwater ocean stream.

Description of the Related Art

Electricity generation from renewable energy sources is increasing to reduce reliance on fossil fuels for energy generation. Renewable sources, such as solar and wind are common. However, such sources are intermittent since electricity from solar power can only be produced during daytime and electricity from wind can only be produced when the wind is blowing.

SUMMARY

In accordance with one aspect of the disclosure, a system and method are provided for generating continuous electricity from a constant renewable energy source—an underwater ocean stream.

In accordance with one aspect of the disclosure, a system and method are provided for generating electricity from an underwater ocean stream using an underwater turbine.

In accordance with one aspect of the disclosure, a system and method are provided for generating hydrogen via electricity generated from an underwater ocean stream using an underwater turbine.

In some aspects, the techniques described herein relate to a system for generating electricity from an underwater ocean stream, including: an underwater turbine including: an upper pontoon; a lower pontoon; and a pylon structure extending between and interconnecting the upper pontoon and the lower pontoon, and a single propeller assembly with a plurality of blades being rotatably coupled to the lower pontoon and configured to be rotated by a force from an underwater ocean stream flowing along the lower pontoon and past the propeller assembly.

In some aspects, the techniques described herein relate to a system for generating electricity from an underwater ocean stream, including: an underwater turbine including: an upper pontoon; a lower pontoon; and a pylon structure extending between and interconnecting the upper pontoon and the lower pontoon, and a single propeller assembly with a plurality of blades being rotatably coupled to the lower pontoon and configured to be rotated by a force from an underwater ocean stream flowing along the lower pontoon and past the propeller assembly, wherein the upper pontoon applies a vertical buoyant force on the lower pontoon, wherein rotation of the propeller assembly generates electricity via a generator in the lower pontoon, and wherein the upper pontoon is configured to automatically generate a counter moment in an opposite direction to a moment generated by the rotation of the propeller assembly to inhibit a roll motion of the underwater turbine about an axis of the lower pontoon and configured to facilitate alignment of the lower pontoon with an underwater stream flowing along the lower pontoon and past the propeller assembly.

In some aspects, the techniques described herein relate to a system for generating electricity from an underwater ocean stream, including: an underwater turbine including: an upper pontoon; a lower pontoon; a pylon structure extending between and interconnecting the upper pontoon and the lower pontoon, and a single propeller assembly with a plurality of blades being rotatably coupled to the lower pontoon and configured to be rotated by a force from an underwater ocean stream flowing along the lower pontoon and past the propeller assembly; and a cable extending between a pulley of the lower pontoon and a mooring weight configured to be located on a sea floor, wherein a buoyant force applied by the upper pontoon on the lower pontoon, a drag force applied by a stream on the lower pontoon and the propeller assembly, and a tension force applied by the cable are configured to intersect at a location centered on the lower pontoon to inhibit a pitch of the lower pontoon and to facilitate alignment of the lower pontoon with an underwater stream flowing along the lower pontoon and past the propeller assembly.

In some aspects, the techniques described herein relate to a system for generating electricity from an underwater ocean stream, including: an underwater turbine including: an upper pontoon; a lower pontoon; a pylon structure extending between and interconnecting the upper pontoon and the lower pontoon, and a single propeller assembly with a plurality of blades being rotatably coupled to the lower pontoon and configured to be rotated by a force from an underwater ocean stream flowing along the lower pontoon and past the propeller assembly; and a cable extending between a pulley of the lower pontoon and a mooring weight configured to be located on a sea floor, a position of the pulley being laterally adjustable in a direction parallel to an axis of the lower pontoon, wherein a buoyant force applied by the upper pontoon on the lower pontoon, a drag force applied by a stream on the lower pontoon and the propeller assembly, and a tension force applied by the cable on the pulley being configured to intersect at a location centered on the lower pontoon to inhibit a pitch of the lower pontoon and to facilitate alignment of the lower pontoon with an underwater stream flowing along the lower pontoon and past the propeller assembly, the position of the pulley being adjustable to maintain said intersection of the forces at said centered location.

In some aspects, the techniques described herein relate to a system for generating electricity from an underwater stream, including a plurality of underwater turbines. The plurality of underwater turbines each include: an upper pontoon, a lower pontoon, a pylon structure extending between and interconnecting the upper pontoon and the lower pontoon, a single propeller assembly with a plurality of blades being rotatably coupled to the lower pontoon and configured to be rotated by a force from an underwater ocean stream flowing along the lower pontoon and past the propeller assembly. Additionally, the upper pontoon applies a vertical buoyant force on the lower pontoon. Rotation of the propeller assembly generates electricity via a generator in the lower pontoon. The upper pontoon is configured to automatically generate a counter moment in an opposite direction to a moment generated by the rotation of the propeller assembly to inhibit a roll motion of the underwater turbine about an axis of the lower pontoon and configured to facilitate alignment of the lower pontoon with the underwater ocean stream flowing along the lower pontoon and past the propeller assembly. The system also includes a junction box operatively coupled to each of the plurality of underwater turbines via electrical cables connecting the junction box with the plurality of underwater turbines. The junction box is configured to transfer the electricity generated by the plurality of underwater turbines via a power collector cable.

BRIEF DESCRIPTION OF THE DRAWINGS

FIG. 14A is a schematic partial cross-sectional side view of a bottom pontoon of the underwater turbine with folded blades for generating electricity from an ocean stream in FIG. 10A and disposed in a storage or shipping container.

FIG. 14B is a schematic end view of a bottom pontoon of the underwater turbine with folded blades for generating electricity from an ocean stream in FIG. 10A and disposed in a storage or shipping container.

DETAILED DESCRIPTION

Figure 1:
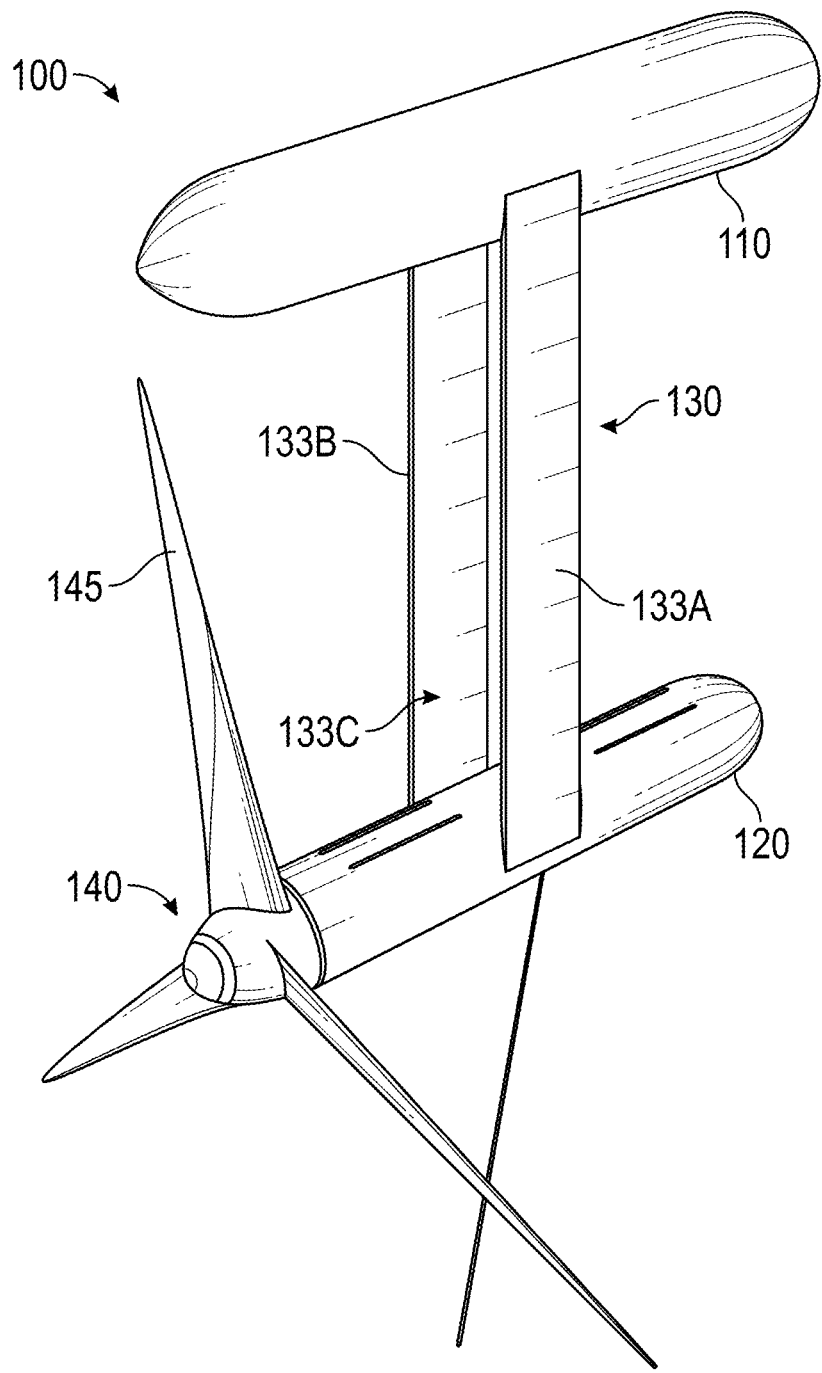
FIG. 1 is a schematic front perspective view of an underwater turbine for generating electricity from an ocean stream.
Figure 1A:
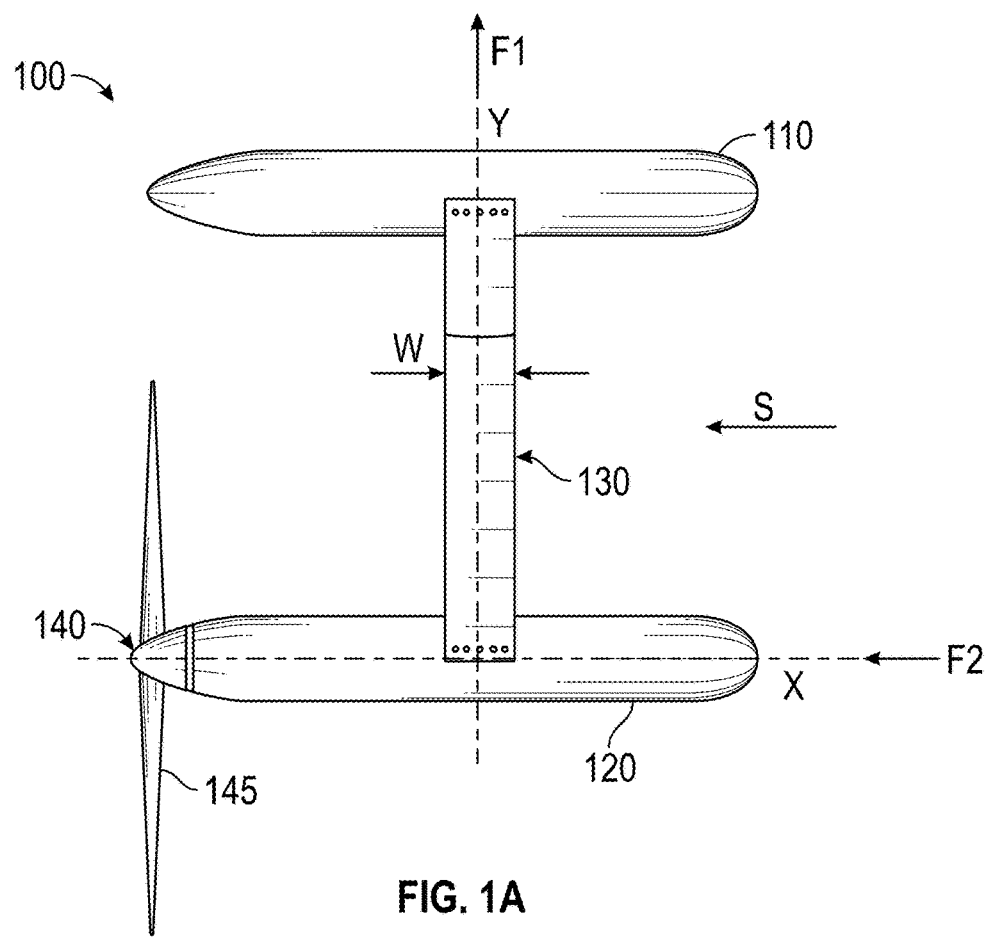
FIG. 1A is a schematic side view of the underwater turbine for generating electricity from an ocean stream in FIG. 1.
Figure 1B:
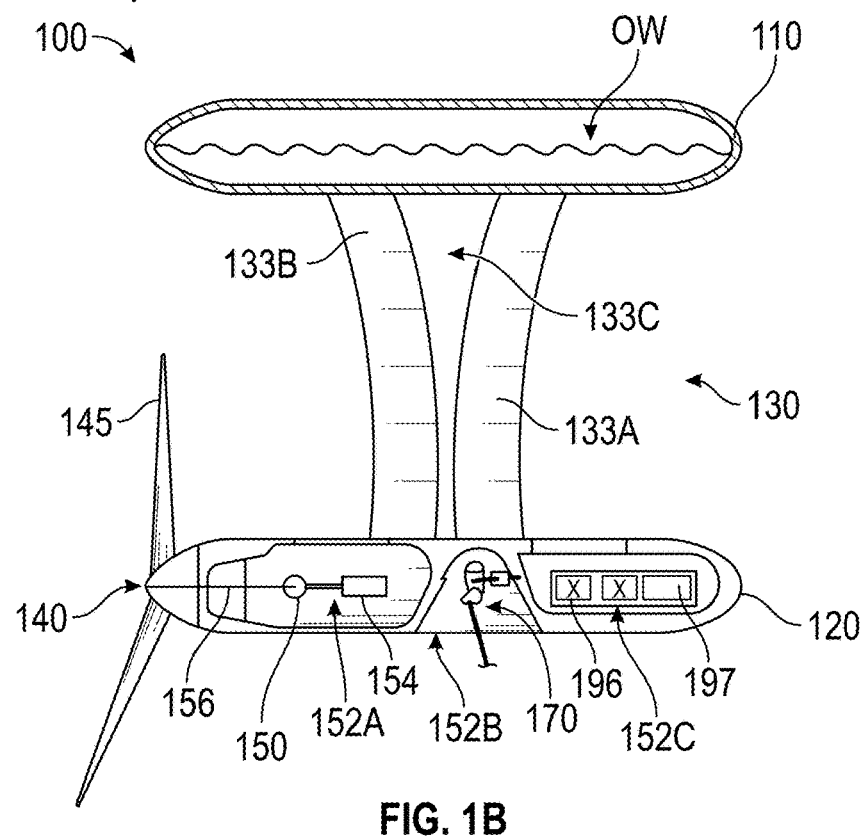
FIG. 1B is a schematic partial cross-sectional view of the underwater turbine for generating electricity from an ocean stream in FIG. 1.
Figure 1C:
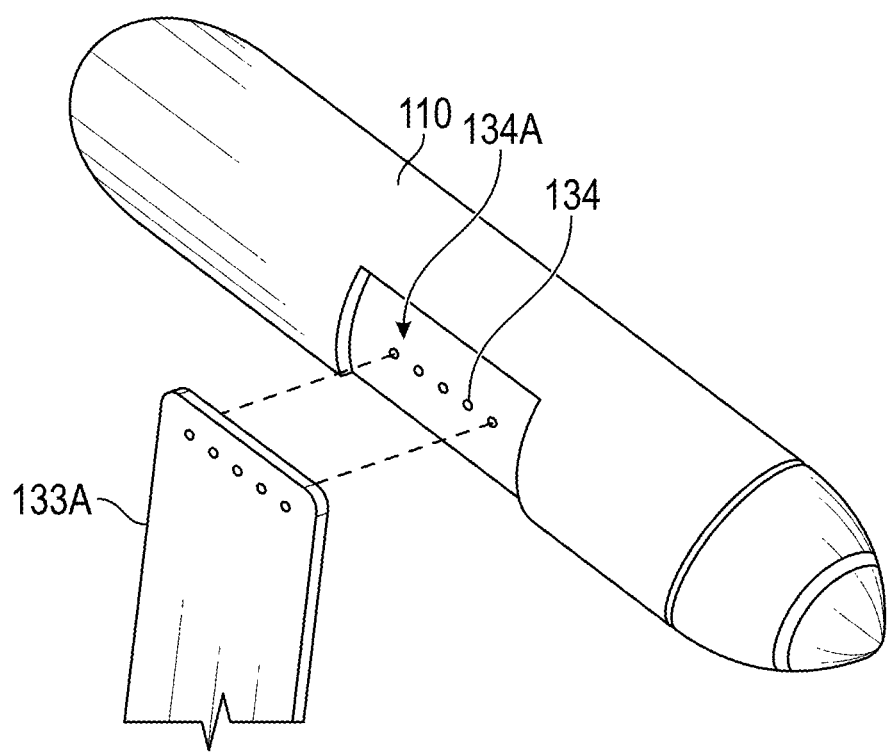
FIG. 1C is a schematic partial exploded view of a pylon structure and pontoon of the underwater turbine for generating electricity from an ocean stream in FIG. 1.
Figure 1D:
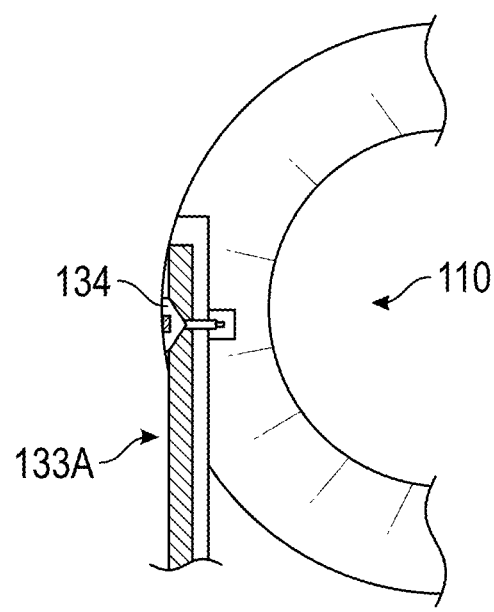
FIG. 1D is a schematic partial assembled view of a pylon structure and pontoon of the underwater turbine for generating electricity from an ocean stream in FIG. 1.
Figure 1E:
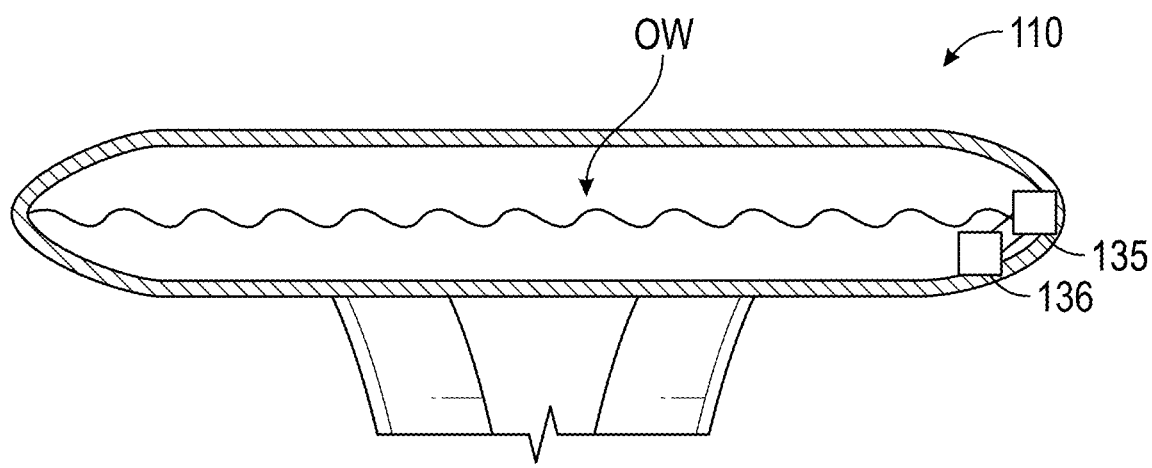
FIG. 1E is a schematic cross-sectional view of an upper pontoon of the underwater turbine for generating electricity from an ocean stream in FIG. 1.

FIGS. 1-1E show an underwater turbine 100 (e.g., system) for use in generating electricity from an ocean stream (i.e., the gulf stream off the coast of Florida). The underwater turbine 100 includes an upper pontoon 110 and a lower pontoon 120 interconnected by a pylon structure 130, and a propeller assembly 140 with multiple (e.g., three) blades 145. The upper pontoon 110 and lower pontoon 120 have rounded edges to advantageously reduce drag forces on the turbine (e.g., the upper pontoon 110 and lower pontoon 120 have circular transverse cross-sections). In one implementation, the pylon structure 130 can include two pieces of sheet metal, 133A, 133B connected to the upper pontoon 110 and lower pontoon 120 via fasteners 134 (e.g., rivets, screws, bolts, welts, etc.). The sheet metal 133A, 133B can be thin, for example be between 2 mm to 5 mm in thickness, which can facilitate or improve the hydrodynamics of the underwater turbine 100. Additionally, the sheet metal 133A, 133B can have a width W of between about 900 mm and about 1500 mm, such as 1250 mm. Advantageously, due to the pylon structure 130, the underwater turbine 100 is more hydrodynamic and can allow water to pass through an opening 133C between the two pieces of sheet metal 133A, 133B (e.g., to reduce an effect of current forces acting on the underwater turbine 100). Additionally, the underwater turbine 100 is buoyant, with the upper pontoon 110 selectively providing at least 50% (e.g., 60%, 70%, 100%) of the buoyancy for the underwater turbine 100 and applying a buoyant force F1 on the underwater turbine 100 (e.g., on the pylon structure 130 and lower pontoon 120). However, as discussed further below, the buoyancy of the upper pontoon 110 is selectively adjustable to facilitate raising the underwater turbine 100 (e.g., by increasing the buoyancy of the upper pontoon 110) or to facilitate lowering the underwater turbine 100 (e.g., by decreasing the buoyancy of the upper pontoon 110). In one implementation, the upper pontoon 110 can be at least partially hollow and filled with either or both air and ocean water. As shown in FIG. 1, neither the upper pontoon 110 nor the lower pontoon 120 have any wings that extend laterally from the surface of the pontoon 110, 120.

With continued reference to FIGS. 1-1B, the upper pontoon 110 and lower pontoon 120 can have the same shape or profile (e.g., transverse or cross-sectional shape, substantially same length, same outer diameter), which can advantageously reduce the cost of manufacture (e.g., by using a single mold to make the upper pontoon 110 and the lower pontoon 120). Additionally, by having the same shape or profile, the upper pontoon 110 and the lower pontoon 120 can experience the same amount of drag (e.g., same drag force) from the stream S (e.g., underwater ocean stream). The upper pontoon 110 and lower pontoon 120 can also be made of the same material. For example, in one implementation the upper pontoon 110 and the lower pontoon 120 can be made of concrete. Advantageously, having the upper pontoon 110 and the lower pontoon 120 made of concrete allows the upper pontoon 110 and the lower pontoon 120 to withstand greater compressive forces from being underwater without requiring them to be pressurized to exert a counterforce from within the upper pontoon 110 and the lower pontoon 120 against the compressive force applied by being underwater. Optionally, the upper pontoon 110 and the lower pontoon 120 can be coated with a concrete sealant to inhibit (e.g., prevent) water from penetrating the outer layer of the upper pontoon 110 and the lower pontoon 120. With reference to FIG. 3C, the lower pontoon 120 can have a wall thickness W2 of between about 50 mm and about 200 mm, such as 100 mm. In one implementation, the upper pontoon 110 can have a wall thickness equal to that of the lower pontoon 120.

With continued reference to FIG. 1B, the lower pontoon 120 can include three compartments, including a first compartment 152A, a second compartment 152B, and a third compartment 152C. The first compartment 152A can include an electric motor 154 (and optionally a gear box), a bearing 151 (see FIG. 3A), an opening or outlet 151A, a generator 150, and a shaft 156. The second compartment 152B can include a pitch control mechanism 170. Additionally, the third compartment 152C can include a pump (e.g., hydraulic 196 and/or electric 197). The operation of the listed components and compartments is described further below.

FIGS. 1C-1D shows a cross-section of the upper pontoon 110, where the sheet metal 133A (or 133B) is fixed to the upper pontoon 110 via fasteners 134 (e.g., rivets, screws, bolts, welts, etc.). The upper pontoon 110 can have a recess 134A, where the recess 134A is designed to receive a portion of the sheet metal 133A. Advantageously, this can improve the hydrodynamics of the sheet metal 133A, 133B by reducing drag since the sheet metal 133A, 133B is flush (e.g., even, level, etc.) with the surface of the upper pontoon 110. Therefore, resistance or turbulence can be inhibited (e.g., prevented) at the interface between the sheet metal 133A (or 133B) and the upper pontoon 110. Although not shown, the lower pontoon 120 can also have a similar recess designed to receive a portion of the sheet metal 133A (or 133B) to improve hydrodynamics of the underwater turbine 100.

FIG. 1E shows a cross-section of the upper pontoon 110, where the upper pontoon 110 is hollow, at ambient pressure (e.g., atmospheric pressure) and is operably connected to a pump 135. The pump 135 of the upper pontoon 110 can be selectively operated to supply water OW into the hollow shell of the upper pontoon 110 to increase the weight of the upper pontoon 110 (e.g., decreasing the buoyancy of the upper pontoon 110). Advantageously, this will increase the weight of the underwater turbine 100 (e.g., decreasing the buoyancy of the underwater turbine 100), causing the underwater turbine 100 to sink to a lower depth. The pump 135 can also be selectively operated to drain water OW out of the hollow shell of the upper pontoon 110 to decrease the weight of the upper pontoon 110 (e.g., increasing the buoyancy of the upper pontoon 110). Advantageously, this will decrease the weight of the underwater turbine 100 (e.g., increasing the buoyancy of the underwater turbine 100), causing the turbine to be raised to a shallower depth. In some embodiments, the upper pontoon 110 can have a cover 159 (see FIG. 3C). Advantageously, this can allow a user to access the pump 135, such as for maintenance, repairs or replacement.

Though not shown, the operation of the pump 135 can be controlled by an electronic controller 136 (e.g., using one or more processors), for example based on input (e.g., instructions, commands) from a user to raise or lower the underwater turbine 100. In another implementation, the operation of the pump 135 can be automatically controlled by an electronic controller 136 (e.g., using one or more processors) based at least in part on data from sensors of the underwater turbine 100 (e.g., gyroscopes or tilt sensors that sense the tilt of the underwater turbine 100, speed or flowrate sensors that measure the speed of the underwater current, sensors that sense one or more parameters of the operation of the components in the underwater turbine 100). For example, if a sensor senses the underwater stream speed is too high, the controller can operate the pump 135 to cause the underwater turbine 100 to be lowered to a lower depth in the ocean where the speed of the underwater stream may be lower. Alternatively, the sensed speed of the underwater stream is too low, the controller can operate the pump 135 to cause the underwater turbine 100 to be raised to a shallower depth where the underwater stream speed is higher. In another example, if a sensor senses a malfunction in a component of the underwater turbine 100 and that requires maintenance, or if scheduled maintenance is needed, the controller 136 can operate the pump 135 to cause the underwater turbine 100 to be raised to the surface of the ocean.

Figure 2:
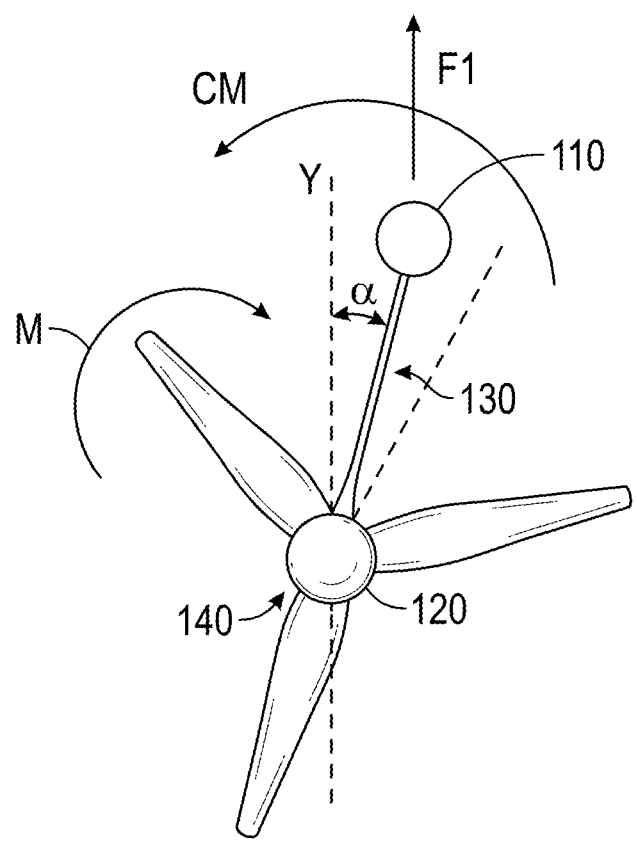
FIG. 2 is a schematic front view of the underwater turbine in FIG. 1.

With reference to FIG. 2, one advantage of the underwater turbine 100 is that the upper pontoon 110 automatically applies a counter torque or counter moment CM (e.g., in counterclockwise direction in FIG. 2) on the underwater turbine 100 that balances against a torque or moment M (e.g., in the clockwise direction in FIG. 2) applied on the underwater turbine 100 by the rotation of the propeller assembly 140 (e.g., due to the force applied on the propeller assembly 140 by the underwater stream S). The underwater turbine 100 can reach an equilibrium orientation where the counter moment CM is balanced against the moment M, and this equilibrium orientation can be angled away from the vertical axis Y by an angle α. Additionally, the counter torque or counter moment CM applied by the upper pontoon 110 self-adjusts so that the angle α can vary depending on the amount of torque applied by the rotation of the propeller assembly 140 (e.g., due to a change in speed of rotation caused by a change in speed of the underwater stream S). Accordingly, the upper pontoon 110 facilitates (e.g., assists) in maintaining the underwater turbine 100 in an equilibrium orientation during operation and inhibiting (e.g., preventing) a roll motion of the lower pontoon 120 about the X axis (see FIG. 1A). Additionally, the automatic counter torque or counter moment applied by the upper pontoon 110 to counter the torque or moment applied by the rotation of the propeller assembly 140 allows for the underwater turbine 100 to only have one propeller assembly 140 (e.g., the system does not need to have a second propeller assembly 140 rotating in an opposite direction to counter the torque or moment applied by the first propeller assembly 140), therefore advantageously resulting in a simpler system and reducing cost of manufacture, maintenance and operation of the underwater turbine 100.

Figure 3:
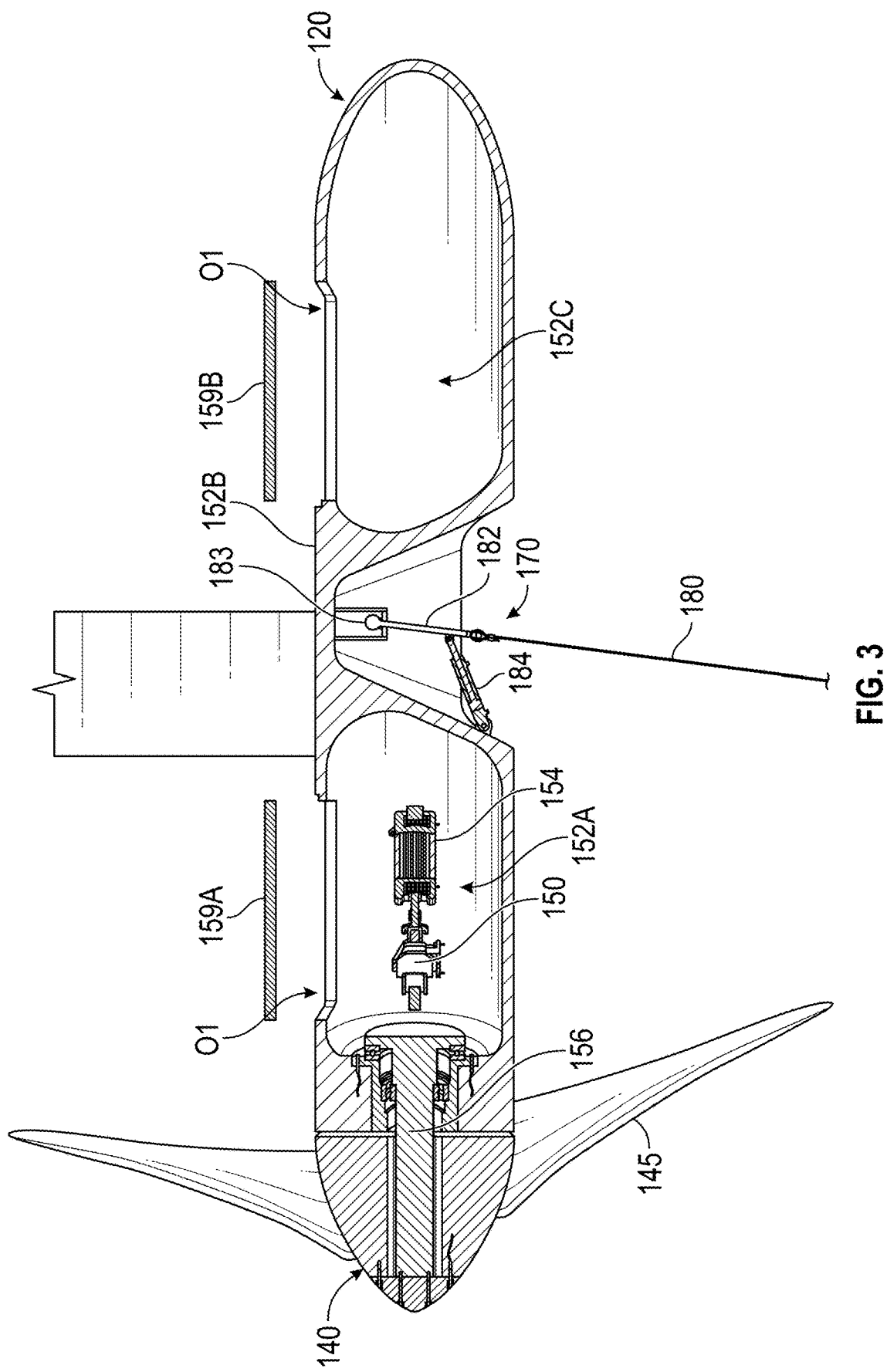
FIG. 3 is a schematic partial cross-sectional side view of a bottom pontoon of an underwater turbine for generating electricity from an ocean stream.
Figure 3A:
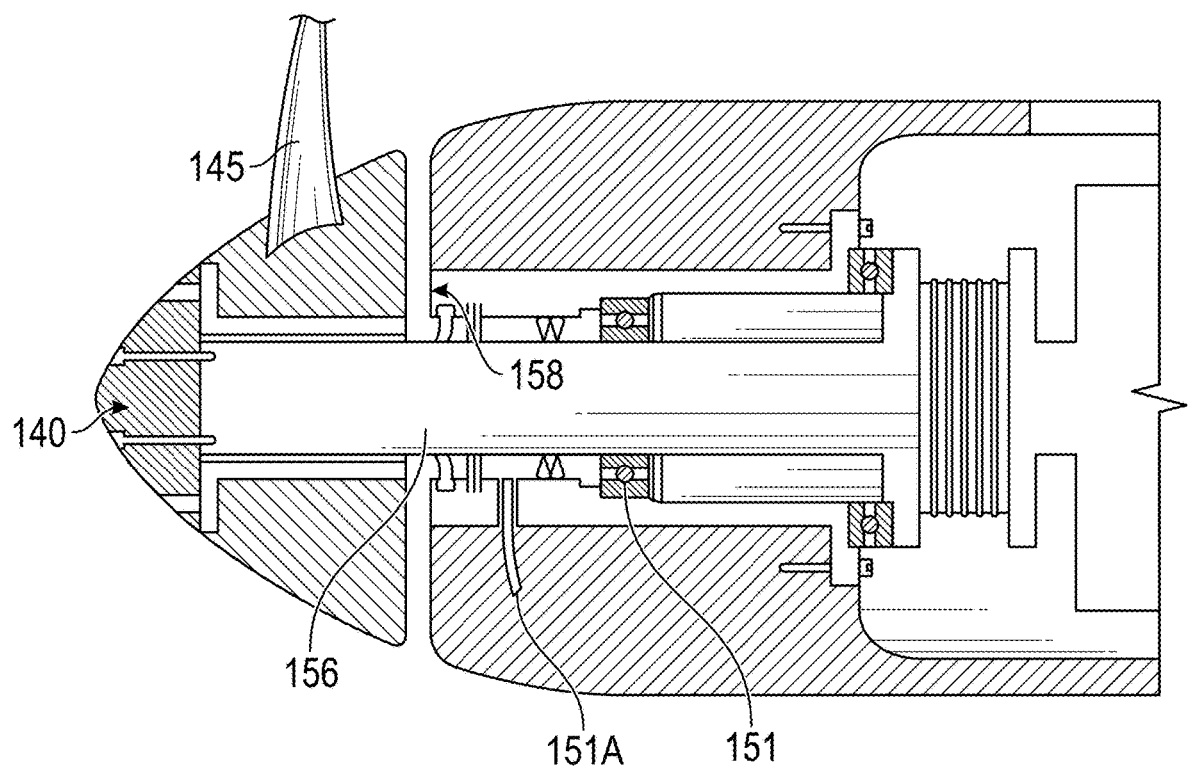
FIG. 3A is a schematic partial cross-sectional side view of a bottom pontoon of the underwater turbine for generating electricity from an ocean stream in FIG. 3.
Figure 3B:
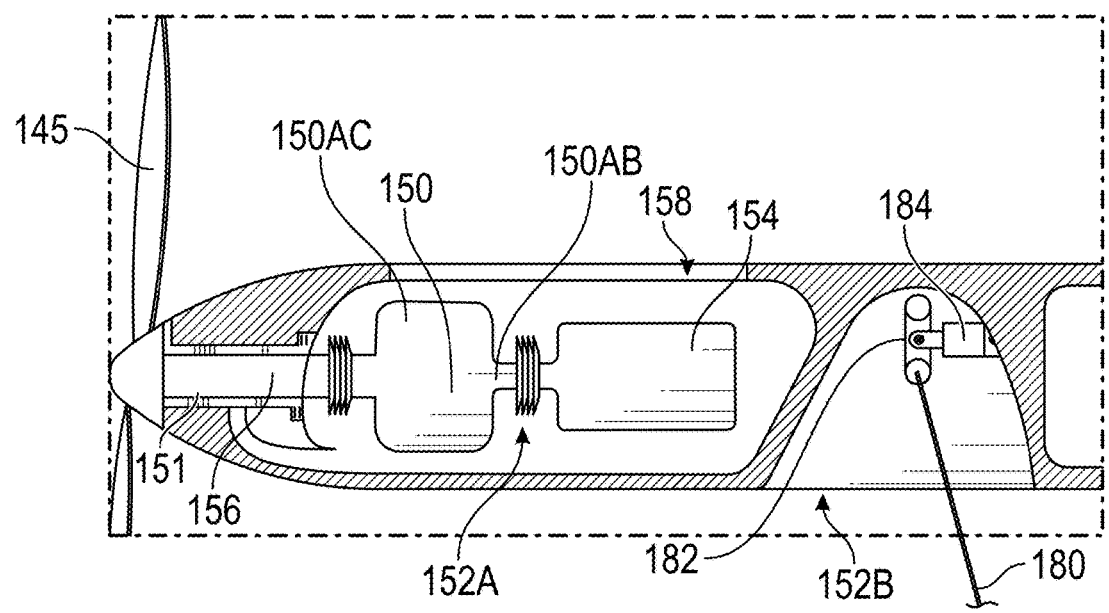
FIG. 3B is another schematic partial cross-sectional side view of a bottom pontoon of the underwater turbine for generating electricity from an ocean stream in FIG. 3.
Figure 3C:
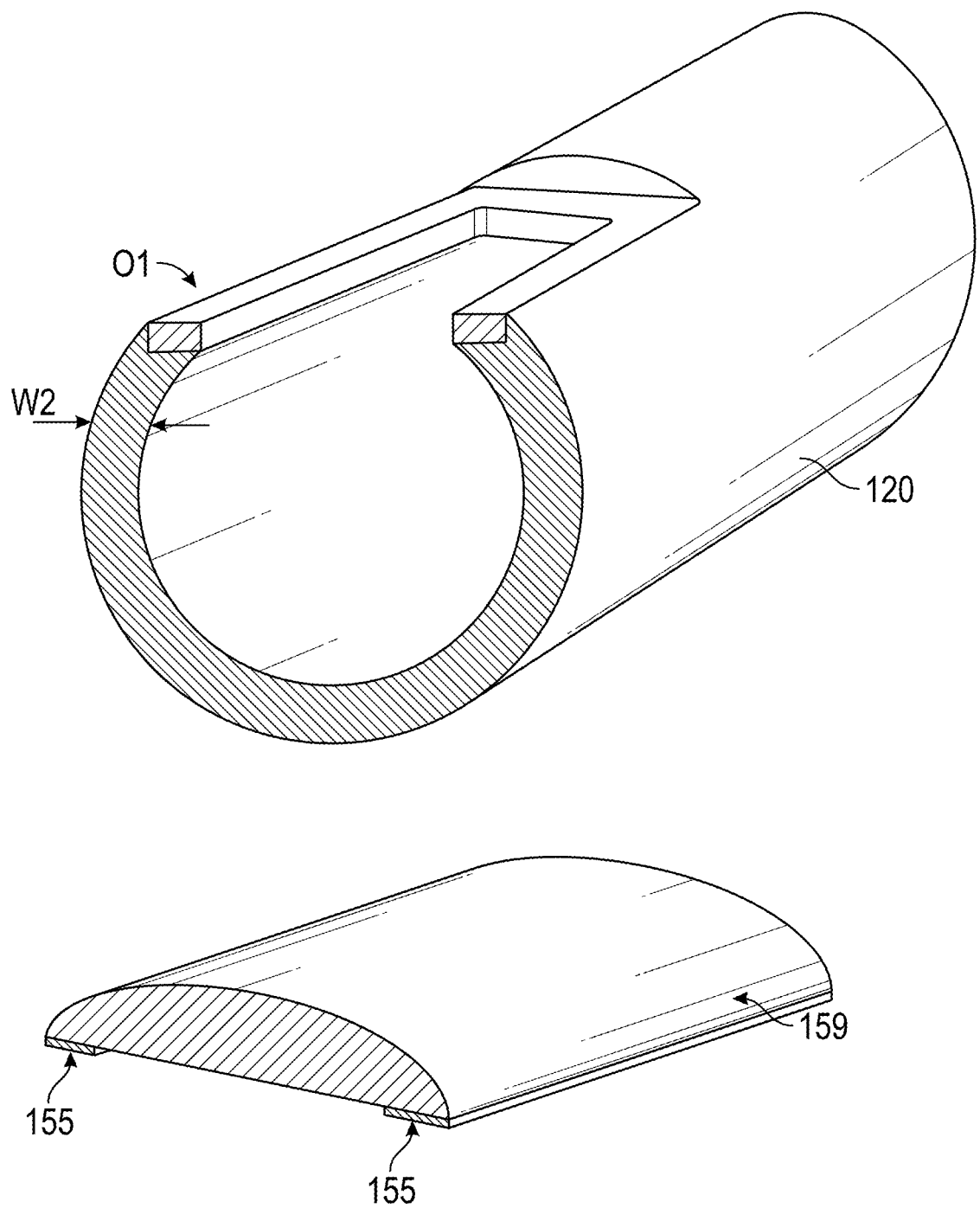
FIG. 3C is a schematic perspective disassembled view of a bottom pontoon of the underwater turbine for generating electricity from an ocean stream in FIG. 3.

FIGS. 3-3B shows a cross-sectional view of the lower pontoon 120 of the underwater turbine 100 and the propeller assembly 140 with one or more (e.g., multiple, three) blades 145 rotatably coupled to the lower pontoon 120. The blades 145 can advantageously be made of a material that is cost effective and has improved corrosion resistance. In one implementation, the blades 145 can be made of a cast aluminum alloy material (e.g., A380 alloy). In another implementation, the blades 145 can be made of fiber reinforced concrete. The blades 145 are rotated about the axis of the lower pontoon 120 by a force exerted by an underwater stream on the propeller assembly 140. During operation, the rotation of the propeller assembly 140 (e.g., caused by the underwater stream S) rotates the shaft 156, which rotates one portion (e.g., armature, rotor 150AB) of the generator 150 relative to another portion (e.g., stator 150AC) of the generator 150 to generate electricity. In some implementations, the underwater turbine 100 generates 50-100 kW of power. In one implementation, the generator (e.g., electric motor-generator 150) can include a variable frequency drive that allows it to operate at different speeds. Though not shown, one or more power cables can be connected to the generator 150 via which the generated electricity is transmitted from the underwater turbine 100, as further discussed below.

The underwater turbine 100 also includes three compartments in the lower pontoon 120, including a first compartment 152A, a second compartment 152B, and a third compartment 152C. The first compartment 152A and third compartment 152C can be filled with air, which provides an amount of buoyancy to the lower pontoon 120 (e.g., independent of the buoyant force applied to the upper pontoon 110). Furthermore, the first compartment 152A and third compartment 152C can be maintained at atmospheric pressure within the shell of the lower pontoon 120 and remain dry (e.g., ocean water does not enter the first compartment 152A and third compartment 152C). In one implementation, the first compartment 152A is sealed (e.g., waterproof) relative to the second compartment 152B and the third compartment 152C is sealed (e.g., waterproof) relative to the second compartment 152B. The first compartment 152A can include an electric motor 154 (and optionally a gear box) coupled to a bearing 151 (see FIG. 3A) and the generator 150 which can be operably connected to the shaft 156, where the shaft 156 is coupled to the propeller assembly 140.

The first compartment 152A can be connected to a humidity chamber 158 (see FIG. 3A). When water enters the humidity chamber 158 through a seal on the lower pontoon 120, the water is pumped out of the humidity chamber 158 to inhibit (e.g., prevent) ocean water from entering the first compartment 152A. The second compartment 152B can include a pitch control mechanism 170 (see FIG. 3A) operable to maintain the lower pontoon 120 aligned with the underwater stream S (e.g., maintain the lower pontoon 120 in a horizontal orientation along the X axis, shown in FIG. 1A). Operation of the pitch control mechanism 170 is described further below. The third compartment 152C can include a pump (e.g., hydraulic and/or electric) which can maintain the chambers at ambient air pressure (e.g., atmospheric air pressure). In one implementation, the propeller assembly 140 is spaced from an end of the lower pontoon 120, where the water that enters the first compartment 152A can be pumped out of the first compartment 152A. In some implementations, the lower pontoon 120 can have one or more covers (see FIGS. 3 and 3C) 159, 159A, 159B with gaskets 155. Advantageously, this can allow a user to access the components in the compartments (e.g., via openings O1 in the pontoon, such as the lower pontoon 120), for example to make repairs to or replace the compartments or components in the lower pontoon 120.

Figure 4:
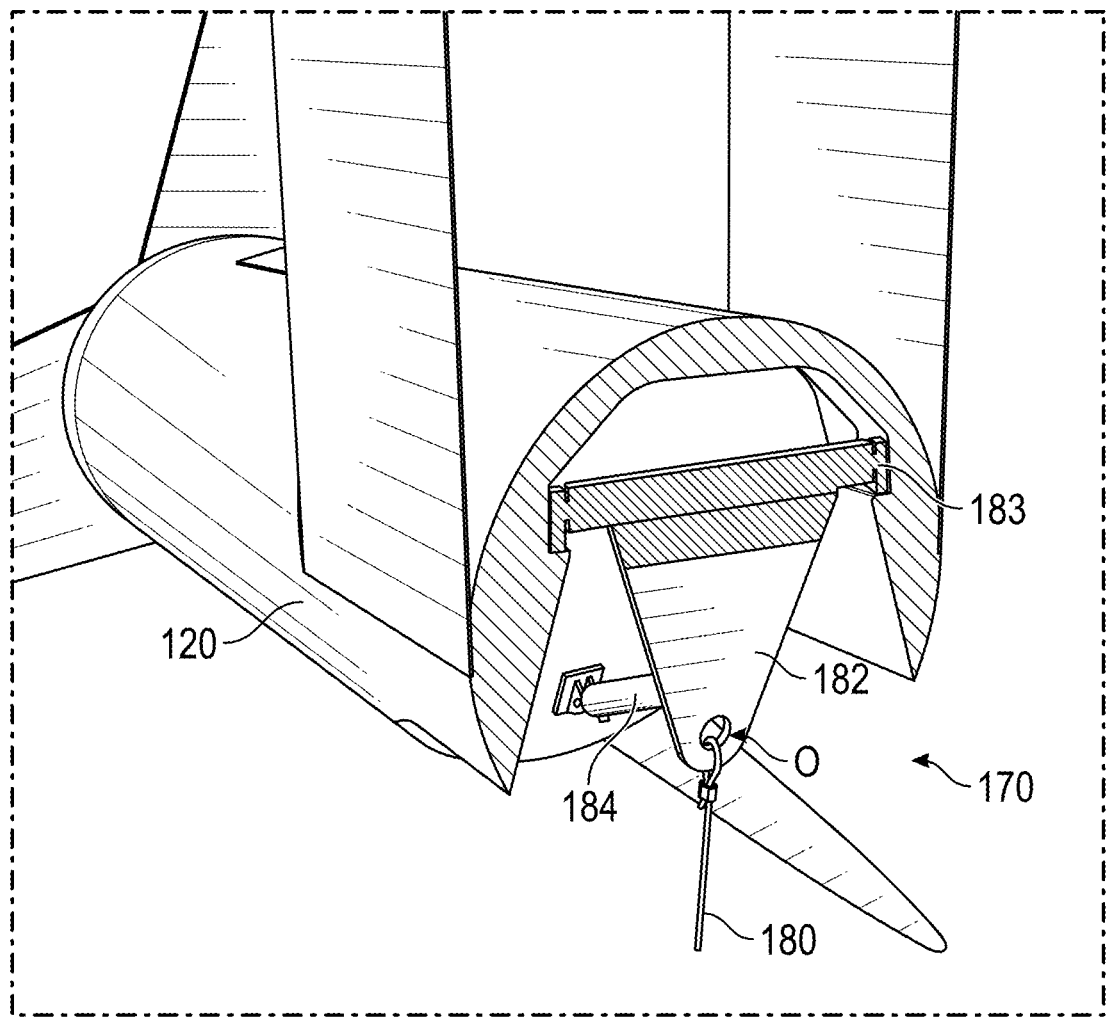
FIG. 4 is a schematic transverse cross-sectional view of a pitch control mechanism of an underwater turbine for generating electricity from an ocean stream.
Figure 4A:
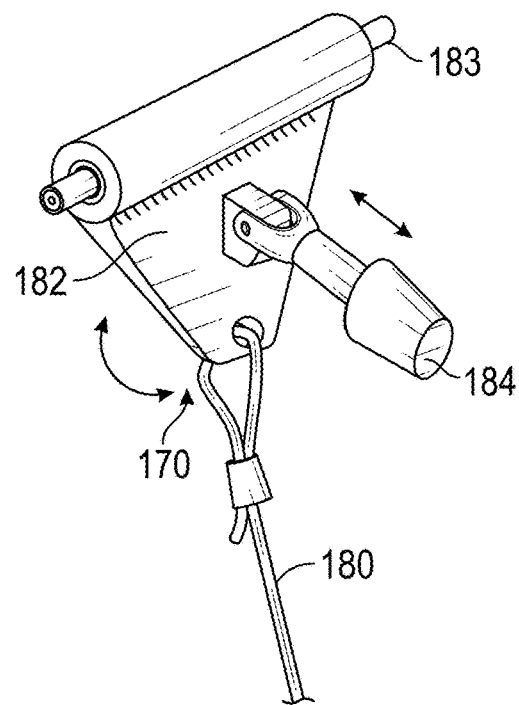
FIG. 4A is another schematic view of and the pitch control mechanism of the underwater turbine for generating electricity from an ocean stream in FIG. 4.
Figure 4B:
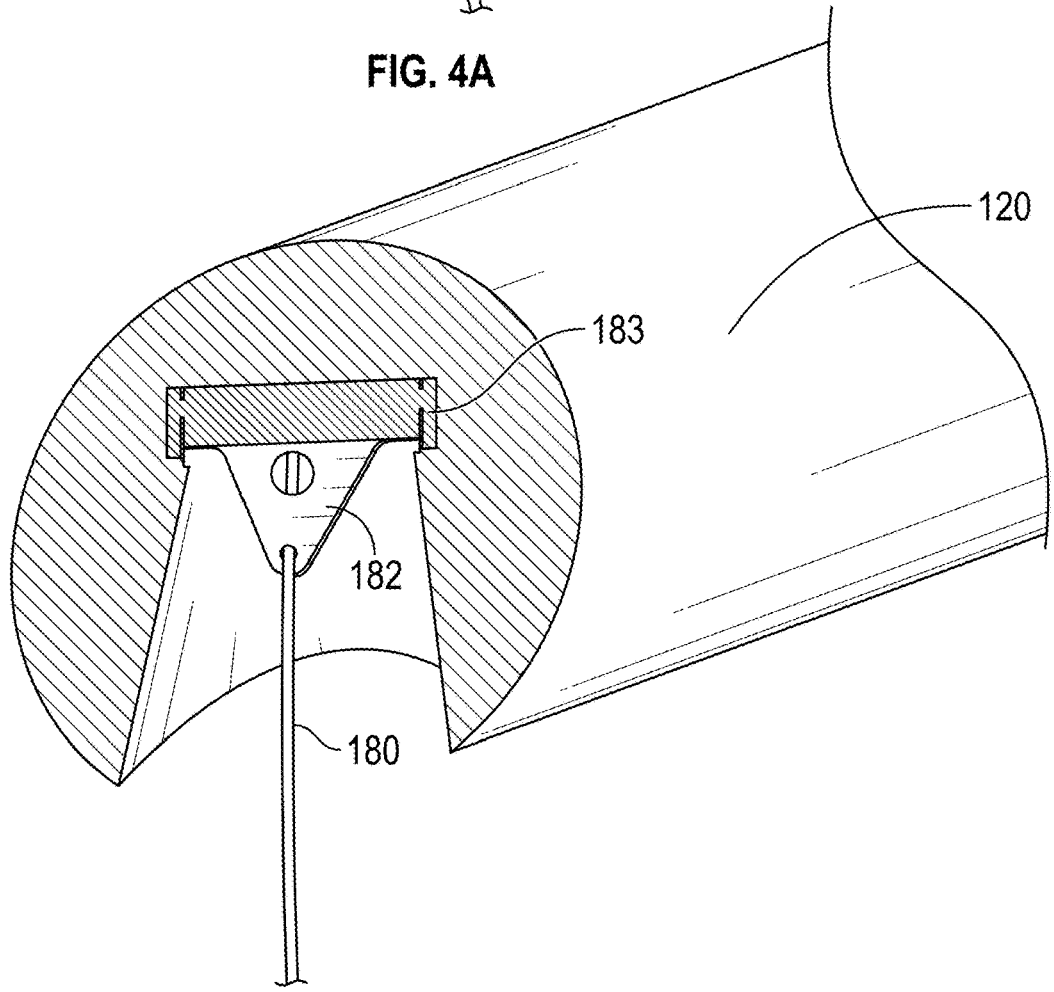
FIG. 4B is another schematic transverse cross-sectional view of the pitch control mechanism of the underwater turbine for generating electricity from an ocean stream in FIG. 4.

FIGS. 4-4B shows the lower pontoon 120 of the underwater turbine 100, where the lower pontoon 120 has the pitch control mechanism 170 operable to maintain the lower pontoon 120 aligned with the underwater stream S (e.g., maintain the lower pontoon 120 in a horizontal orientation X) and inhibits (e.g., prevents, corrects, compensates for) a pitch motion of the lower pontoon 120. The pitch control mechanism 170 is spaced from the end of the lower pontoon 120 to be aligned with a centerline of the lower pontoon 120 extending through the center of the propeller assembly 140 and midline of the pylon structure 130, as further discussed below.

The pitch control mechanism 170 can have a hinge 183, a rigid plate 182, a piston 184 (e.g., piston-cylinder assembly), and a cable 180. The cable 180 can be connected to a mooring weight (e.g., mooring weight A in FIG. 9A) disposed on the ocean floor and can include a first portion coupled to the rigid plate 182 and a second portion coupled to the mooring weight. The mooring weight can in one example be a concrete block that is fixed on the sea floor. In another example, the mooring weight can be an anchor. In another example, the mooring weight can be a movable weight (e.g., a rake) that moves along the sea floor, allowing the underwater turbine 100 to travel (e.g., not be moored in a single location).

The cable 180 can couple to the rigid plate 182 via an opening O on the rigid plate 182 so that the cable 180 connected at the opening O is centered with the midline of the lower pontoon 120, midline of the pylon structure 130, and midline of the propeller assembly 140 (e.g., intersection of lines F1 and F2 in FIG. 1A). The rigid plate 182 can be connected to the hinge 183, which is operably coupled to a portion of the shell of the lower pontoon 120 (e.g., in the second compartment 152B). Therefore, when the rigid plate 182 changes in orientation (e.g., to maintain the lower pontoon 120 aligned with the underwater stream S, in the horizontal position), the rigid plate 182 will rotate about the hinge 183 (e.g., rotate toward the front end of the lower pontoon 120 or rotate toward the rear end of the lower pontoon 120). The pitch control mechanism 170 can adjust the orientation of the rigid plate 182 via the piston 184, which is operably connected to the rigid plate 182. In one example, the piston is extended (relative to a cylinder that the piston travels in) to pivot the rigid plate 182 in one direction (e.g., toward the rear end of the lower pontoon 120). In another example, the piston is retracted (relative to the cylinder that the piston travels in) to pivot the rigid plate 182 in another (opposite) direction (e.g., toward the front end of the lower pontoon 120). The pitch control mechanism 170 is operated to pivot the rigid plate 182 to maintain the orientation of the lower pontoon 120 aligned with the direction of the underwater stream S by counteracting or correcting a pitch of the underwater turbine 100 (e.g., caused by the speed of the underwater stream S, which may cause the force F1 through the pylon structure 130, force F2 from the underwater stream S and force from the cable 180 to not be centered relative to the lower pontoon 120). Advantageously, the shape of the rigid plate 182 is such that it can withstand the forces of the cable 180, piston 184, and hinge 183 without failure. Additionally, the rigid plate 182 has a thin profile in one direction, but a wide profile in a second direction), advantageously allowing the rigid plate 182 to pivot about the axis of the hinge 183, but inhibiting (e.g., preventing) the rigid plate 182 from pivoting in a transverse direction (e.g., pivot in a widthwise direction of the lower pontoon 120). In one implementation, the piston 184 (e.g., piston-cylinder assembly) can be a hydraulically actuated piston. In one implementation, the piston 184 (e.g., piston-cylinder assembly) can be a pneumatically actuated piston. However, the piston 184 can be replaced with any suitable linear actuator (e.g., lead screw assembly) operable to change the angular orientation of the rigid plate 182 to maintain the orientation of the lower pontoon 120 aligned with the direction of the underwater stream S by counteracting or correcting a pitch of the underwater turbine 100.

The piston 184 or linear actuator can be operated by an electronic controller (e.g., having one or more processors). In one implementation, the pitch control mechanism 170 is operated via the electronic controller based on user input. In another implementation, the pitch control mechanism 170 is automatically controlled by the electric controller (e.g., using one or more processors) based at least in part on data from sensors of the underwater turbine 100 (e.g., gyroscopes or tilt sensors that sense the tilt or pitch of the underwater turbine 100). For example, if a sensor senses the underwater turbine is experiencing a pitch relative to horizontal (e.g., X axis in FIG. 1A), the controller can automatically operate the pitch control mechanism 170 to counteract the pitch to bring the underwater turbine 100 into alignment with the underwater stream S.

Another advantage of the underwater turbine 100 is that the upper pontoon 110 is buoyant and applies an upward force F1 (e.g., buoyant force) in a vertical direction (e.g., direction Y) on the pylon structure 130 and the lower pontoon 120. The lower pontoon 120 is attached to a cable 180 which is attached to a mooring weight which applies a force (e.g., tension force) on the lower pontoon 120 and the pylon structure 130 in an opposite direction of the upper pontoon 110 (e.g., a downward direction Y). Therefore, the pylon structure 130 is maintained under tension due to the buoyant force and tension force from the upper pontoon 110 and lower pontoon 120, respectively. Since the pylon structure 130 is made from at least two pieces of thin, sheet metal 133A, 133B, keeping the pylon structure 130 under tension is advantageous and facilitates keeping the underwater turbine 100 in the equilibrium orientation during operation.

Furthermore, since the pylon structure 130 is maintained under tension, the pylon structure 130 will not buckle, permitting the pylon structure 130 to be thin sheets of metal. Additionally, since the pylon structure 130 is maintained under tension, any torque T or moment M applied on the underwater turbine 100 by the rotation of the propeller assembly 140 is transferred through the pylon structure 130 (e.g., the two sheets of thin, hydrodynamic metal 133A, 133B) to the upper pontoon 110 which balances the forces automatically by a counter torque or counter moment CM (see FIG. 2). Therefore, the underwater turbine 100 can reach an equilibrium orientation.

The underwater turbine 100 can be maintained at least 50 m below sea level (e.g., to avoid interference with any ships traveling above the turbine), for example even if the cable 180 were oriented vertically. Advantageously, the depth of the underwater turbine 100 can be varied, as discussed above. For example, the underwater turbine 100 can be raised to sea level SL (e.g., for maintenance). In another example, the depth of the underwater turbine 100 can be varied to expose it to a different stream velocity.

Figure 5:
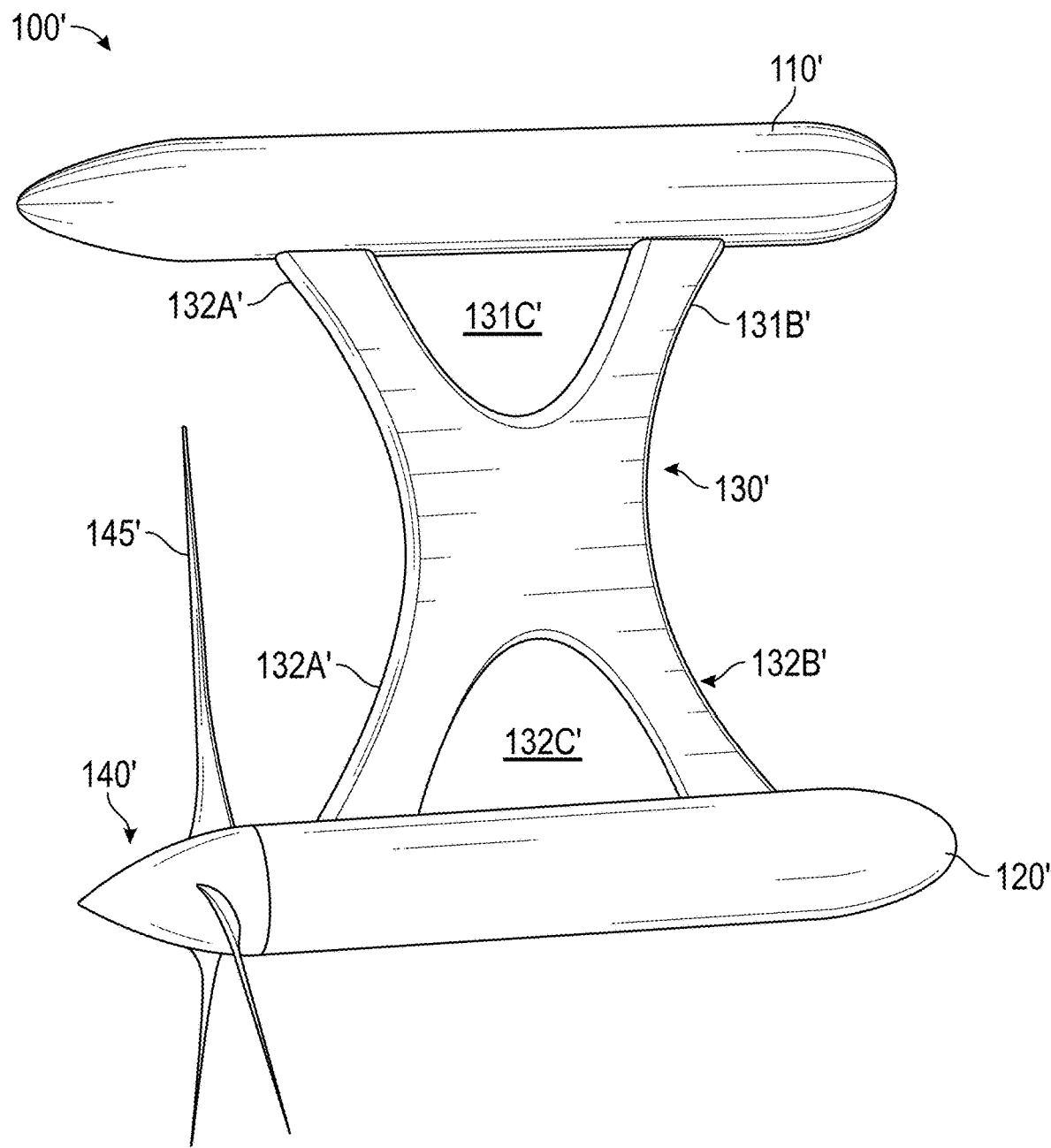
FIG. 5 is a schematic side perspective view of an underwater turbine for generating electricity from an ocean stream.
Figure 6:
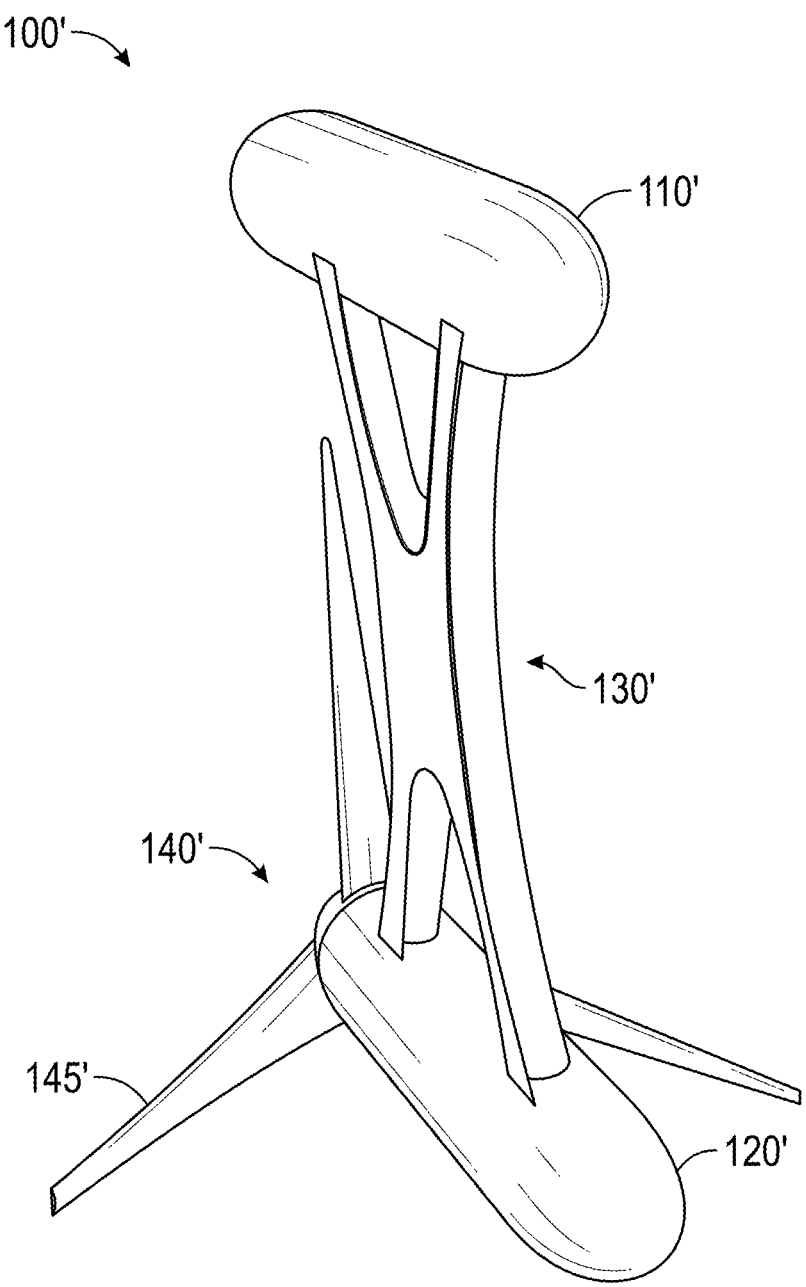
FIG. 6 is a schematic rear perspective view of the underwater turbine in FIG. 5.

FIGS. 5-6 show an underwater turbine 100' for use in generating electricity from an ocean stream (e.g., the gulf stream off the coast of Florida). Some of the features of the system 100' are similar to the features of the system 100 in FIGS. 1-4B. Thus, reference numerals used to designate the various components of the system 100' are identical to those used for identifying the corresponding components of the system 100 in FIGS. 1-4B, except that an "'" has been added to the end of the numerical identifier. Therefore, the structure and description for the various features of the system 100 and how it's operated and controlled in FIGS. 1-4B are understood to also apply to the corresponding features of the system 100' in FIGS. 5-6, except as described below.

The underwater turbine 100' includes an upper pontoon 110' and a lower pontoon 120' interconnected by a pylon structure 130'. The upper pontoon 110', lower pontoon 120' and the pylon structure 130' have rounded edges to advantageously reduce drag forces on the turbine 100' (e.g., the upper pontoon 110' and lower pontoon 120' have circular transverse cross-sections). The pylon structure 130' can be a single structure (e.g., single piece) and include a pair of lower legs 132A', 132B' separated by an opening 132C' and a pair of upper legs 131A', 131B' separated by an opening 131C, where the openings 131C', 132C' allow water to pass therethrough (e.g., to reduce an effect of cross-stream forces, such as into the page in FIG. 1, acting on the turbine 100). Additionally, the pylon structure 130' can operate as a fin that inhibits (e.g., prevents) a yaw motion of the underwater turbine 100' to maintain the underwater turbine 100' aligned with the stream S. Advantageously, the underwater turbine 100' is buoyant, with the upper pontoon 110' providing at least 50% (e.g., 60%, 70%, 100%) of the buoyancy for the underwater turbine 100' and applying a buoyant force F1 (see FIG. 7) on the underwater turbine 100'. In one implementation, upper pontoon 110' can be hollow and filled with air. In another implementation, the upper pontoon 110' can include a foam material.

The upper pontoon 110' and the lower pontoon 120' can have the same shape or profile (e.g., transverse or cross-sectional shape, substantially same length, same outer diameter), which can advantageously reduce the cost of manufacture (e.g., by using a single mold to make the upper pontoon 110' and lower pontoon 120'). Additionally, by having the same shape or profile the upper pontoon 110' and the lower pontoon 120' can experience substantially the same amount of drag (e.g., same drag force) from the stream S (e.g., underwater ocean stream).

With continued reference to FIGS. 5-6, the underwater turbine 100' includes a propeller assembly 140' with one or more (e.g., multiple, a plurality of, three) blades 145' that is rotatably coupled to the lower pontoon 120'. The blades 145' are rotated about the axis X of the lower pontoon 120' by a force F2 (see FIG. 1A) exerted by an underwater stream S (e.g. underwater ocean stream) on the propeller assembly 140'. As with the underwater turbine 100, one advantage of the underwater turbine 100' is that the upper pontoon 110' automatically applies a counter torque or counter moment on the underwater turbine 100' (as shown in FIG. 2) that balances against a torque or moment applied on the underwater turbine 100' by the rotation of the propeller assembly 140' so that the underwater turbine 100' reaches an equilibrium orientation during operation.

Figure 7:
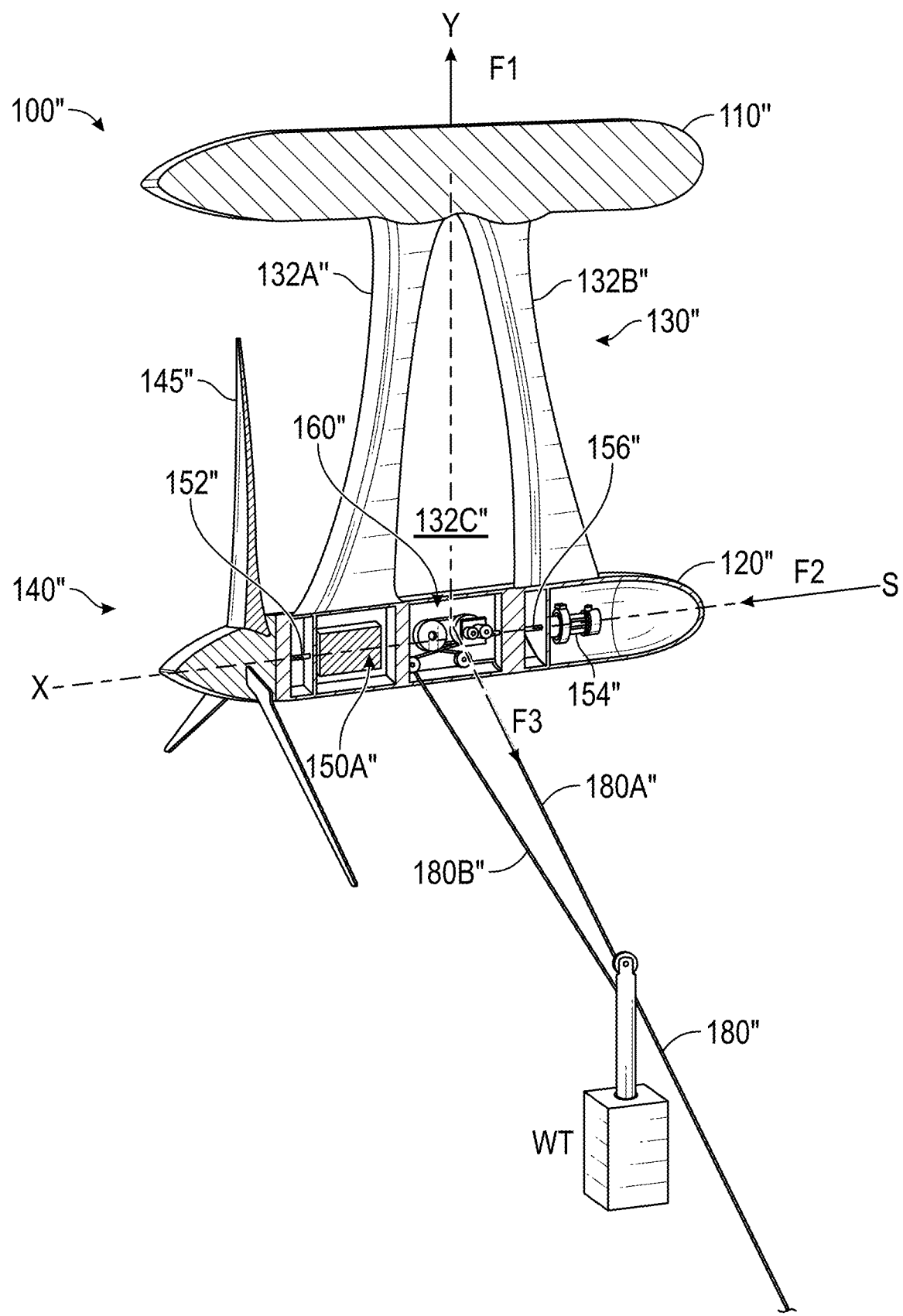
FIG. 7 is a partial cross-sectional view of an underwater turbine.
Figure 8:
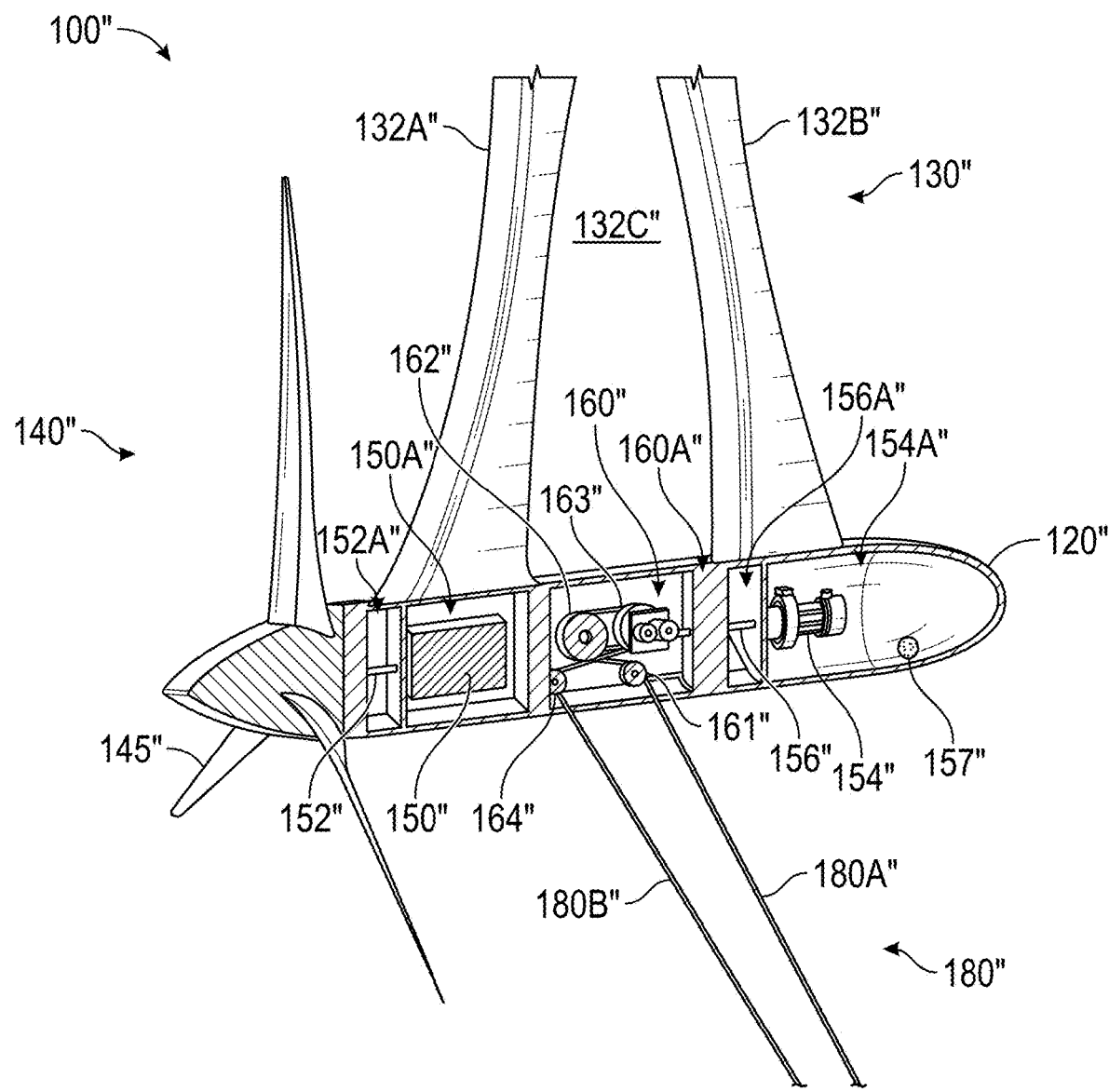
FIG. 8 is an enlarged partial cross-sectional view of a bottom pontoon of the underwater turbine in FIG. 7.

FIGS. 7-8 show another example of the underwater turbine 100", where the pylon structure 130" includes a first leg 132A" and a second leg 132B" that are spaced apart from each other and extend between and interconnect the upper pontoon 110" to the lower pontoon 120", an opening 132C" defined between the first leg 132A" and the second leg 132B" (e.g., along their entire lengths), where the opening 132C" allows water to pass therethrough (e.g., to reduce an effect of cross-stream forces, such as into the page in FIG. 1, acting on the turbine 100"). Some of the features of the system 100" are similar to the features of the system 100 in FIGS. 1-4B or the system 100' in FIGS. 5-6. Thus, reference numerals used to designate the various components of the system 100" are identical to those used for identifying the corresponding components of the system 100 in FIGS. 1-4B, except that a "''" has been added to the end of the numerical identifier. Therefore, the structure and description for the various features of the system 100 and how it's operated and controlled in FIGS. 1-4B and system 100' in FIGS. 5-6 are understood to also apply to the corresponding features of the system 100" in FIGS. 7-8, except as described below.

The pylon structure 130" (e.g., the first leg 132A" and the second leg 132B") can operate as a fin that inhibits (e.g., prevents) yaw movement of the underwater turbine 100" to maintain the underwater turbine 100" aligned with the underwater stream S. The underwater turbine 100" includes a shaft 152" in a first compartment 152A" that couples to the propeller assembly 140" at one end and that couples to a generator (e.g., an electric motor-generator) 150" in a second compartment 150A". During operation, the rotation of the propeller assembly 140" (e.g., caused by the underwater stream S) rotates the shaft 152", which rotates one portion (e.g., armature, rotor) of the generator 150" relative to another portion (e.g., stator) of the generator 150" to generate electricity. In some implementations, the underwater turbine 100" generates 50-100 KW of power. The generator (e.g., electric motor-generator) 150" can include a variable frequency drive that allows it to operate at different speeds. Though not shown, one or more power cables can be connected to the generator 150" via which the generated electricity is transmitted from the underwater turbine 100", as further discussed below.

The underwater turbine 100" also includes an electric motor (and optionally a gear box) 154" in a third compartment 154A", and a shaft 156" in a fourth compartment 156A" that is rotated by the electric motor 154". The electric motor 154" can be operated using power generated by the generator 150". The shaft 156" couples to a pulley assembly 160" in a fifth compartment 160A". In one implementation, the first compartment 152A" is sealed (e.g., waterproof) relative to the second compartment 150A", the second compartment 150A" is sealed relative to the fifth compartment 160A", the fifth compartment 160A" is sealed relative to the fourth compartment 156A" and the fourth compartment 156A" is sealed relative to the third compartment 154A". The compartments 152A", 150A", 160A", 156A", 154A" can be filled with air, which provides an amount of buoyancy to the lower pontoon 120" (independent of the buoyant force applied by the upper pontoon 110"). In one implementation, the propeller assembly 140" is spaced from the end of the lower pontoon 120" (e.g., by about 10 mm, where water that enters the first compartment 152A" can be pumped out of the first compartment 152A").

The pulley assembly incudes a first pulley 161", a second pulley 162", a third pulley 163" and a fourth pulley 164". A cable 180" can be connected to a mooring weight A (see FIG. 9A) and includes a first portion 180A" that winds about at least a portion of the first pulley 161" and continues onto and winds about at least a portion of the second pulley 162", extends to and winds about at least a portion of the third pulley 163", and extends to and winds about at least a portion of the fourth pulley 164". In some examples, the first portion 180A" can wind about the second pulley 162" and the third pulley 163" multiple times (e.g., twice) before extending to the fourth pulley 164". A second portion 180B" of the cable 180" extends from the fourth pulley 164" to a weight assembly 190" (see FIG. 9B). The cable 180" can in some examples have a diameter of about 20 mm. In some examples, the force acting on the cable 180" (e.g., due to the underwater turbine 100' and the mooring weight A) can be 10-15 tons. Though the pulley assembly 160" is shown and described in connection with the underwater turbine 100", one of skill in the art will recognize that the pulley assembly 160" can also be implemented in the underwater turbine 100' or underwater turbine 100 (e.g., instead of the pitch control mechanism 170 shown in FIG. 4-4B).

With reference to FIG. 7, another advantage of the underwater turbine 100" is that upper pontoon 110" assists in maintaining the lower pontoon 120" in a horizontal orientation (e.g., inhibits a pitch motion of the lower pontoon 120") to maintain the underwater turbine 100" aligned with (e.g., horizontal to) the underwater stream S. As discussed above, the upper pontoon 110" is buoyant and applies a buoyant force F1 in a vertical direction (e.g., direction Y) on the lower pontoon 120". The underwater stream S applies a drag force F2 on the lower pontoon 120" and propeller assembly 140" in the X direction. Additionally, the cable 180" attached to the mooring weight A (e.g., the first portion 180A" of the cable 180") applies a force (e.g., tension force) F3 on the lower pontoon 120" via the first pulley 161". Advantageously, the buoyant force F1, drag force F2 and cable (tension) force F3 intersect and are centered on the lower pontoon 120" to inhibit (e.g., prevent) a pitch of the lower pontoon 120" and maintains the lower pontoon 120" substantially horizontal. In one example, the position of the first pulley 161" (in a horizontal direction parallel to the axis X of the lower pontoon 120") can advantageously be adjusted (e.g., via a slider, via lead screw, via a solenoid, etc.) to ensure the forces F1, F2 and F3 are centered to inhibit (e.g., prevent) a pitch moment on the lower pontoon 120". In one example, the tilt sensor (e.g., gyroscope) 157" can be located in the lower pontoon 120" and an electronic controller can control a mechanism to adjust the location of the first pulley 161" based at least in part on a sensed orientation from said tilt sensor 157" to center the forces F1, F2 and F3 to inhibit said pitch moment.

Figure 9A:
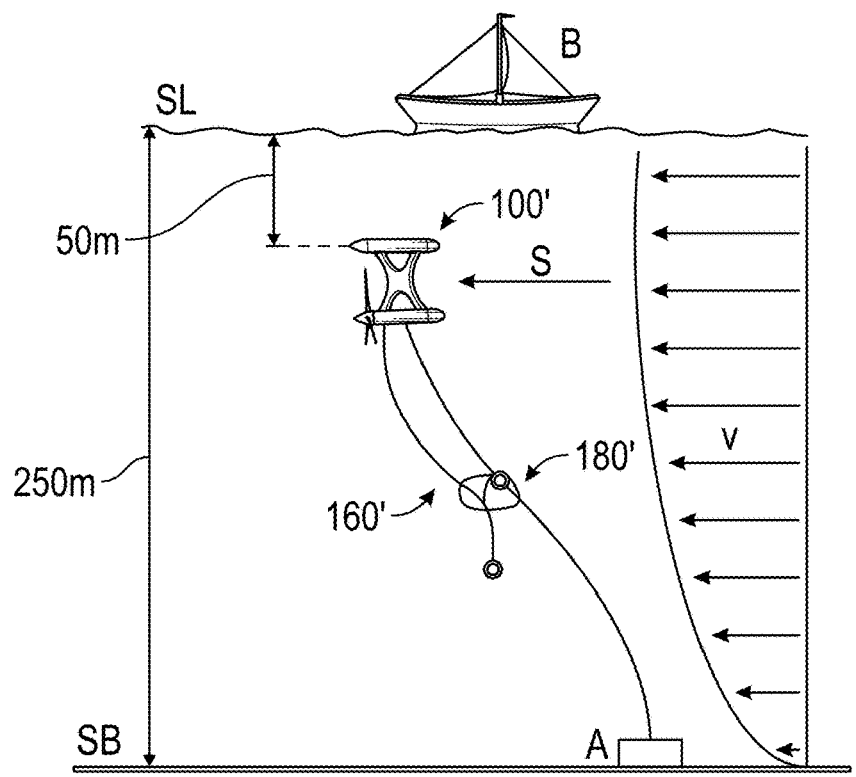
FIG. 9A is a schematic view of the underwater turbine in use.
Figure 9B:
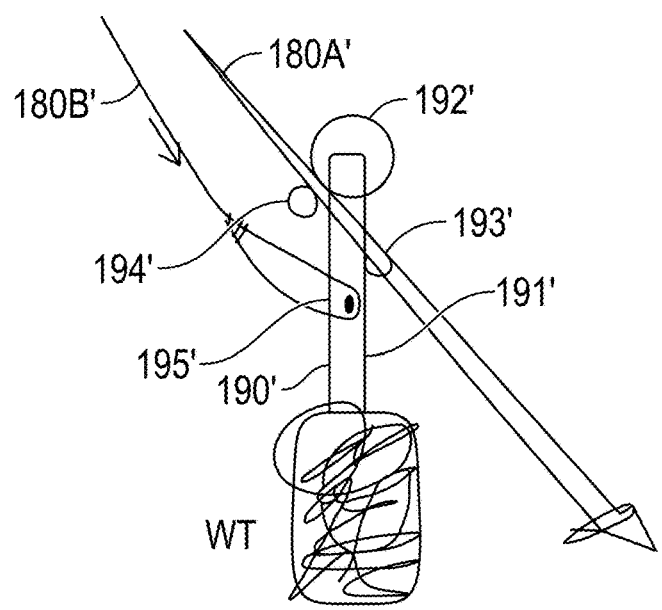
FIG. 9B is an enlarged view of a weight and cable used with the underwater turbine in FIG. 9A.

With reference to FIGS. 9A-9B, the underwater turbine 100' can be maintained at least 50 m below sea level SL (e.g., to avoid interference with any ships B traveling above the turbine 100'), for example even if the cable 180' were oriented vertically. Advantageously, the depth of the underwater turbine 100' can be varied, as further discussed below. For example, the underwater turbine 100' can be raised to sea level SL (e.g., for maintenance). In another example, the depth of the underwater turbine 100' can be varied to expose it to a different underwater stream velocity V. Though FIGS. 9A-9B are shown and described in connection with the underwater turbine 100', one of skill in the art will recognize that the underwater turbine 100 of FIGS. 1-4B and underwater turbine 100" of FIGS. 7-8 can also be maintained at least 50 m below sea level SL and utilize the same mooring system and pulley assembly 160' shown in FIGS. 9A-9B and described below.

The cable 180' can be moored to a mooring weight A. The mooring weight A can in one example be a concrete block that is fixed on the sea floor SB. In another example, the mooring weight A can be an anchor. In another example, the mooring weight A can be a movable weight (e.g., a rake) that moves along the sea floor SB, allowing the underwater turbine 100' to travel (e.g., not be moored in a single location).

The pulley assembly 160' can advantageously be part of or provide a friction winch that frictionally engages (e.g., "grabs" onto) the cable 180' (e.g., the first portion 180A' of the cable 180') to move the underwater turbine 100' up or down. For example, when the friction winch is operated in one direction (e.g., second pulley 162" and third pulley 163" rotated in clockwise direction in FIG. 8) it shortens the first portion 180A' of the cable 180' between the underwater turbine 100' and the mooring weight A to sink the underwater turbine 100' to a greater depth. In another example, when the friction winch is operated in an opposite direction (e.g., second pulley 162" and third pulley 163" rotated in counterclockwise direction in FIG. 8) it lengthens the first portion 180A' of the cable 180' between the underwater turbine 100' and the mooring weight A to raise the underwater turbine 100' to a shallower depth or to sea level SL. Accordingly, the friction winch can be operated to raise the underwater turbine 100' to sea level SL for maintenance. In another example, the friction winch is operated to sink the underwater turbine 100' to a greater depth, for example, to expose the underwater turbine 100' to a smaller velocity V of the underwater stream S, where the velocity V at a shallower depth is much higher (e.g., ~2.1 m/s) than the velocity the underwater turbine 100' is designed for (e.g., 1.5 m/s). Advantageously, operating the friction winch in this manner, as opposed to operating a traditional winch on which the cable is wound, excludes the need for a large spool on which to wind the cable.

With continued reference to FIGS. 9A-9B, the second portion 180B' of the cable 180' that extends from the fourth pulley 164" is advantageously connected to the weight assembly 190' to inhibit (e.g., prevent) the second portion 180B' of the cable 180' from hanging freely and possibly come in contact with the propeller assembly 140'. The weight assembly 190' can include the weight WT a shaft 191' connected to the weight WT and extending to a main roller 192'. The weight assembly 190' can also include secondary rollers 193', 194' to that the first portion 180A' of the cable 180' extends between the main roller 192' and the secondary rollers 193', 194'. The weight assembly 190' has a connector 195' to which the second portion 180B' of the cable 180' connects (e.g., removably couples).

FIGS. 10A-14D show an underwater turbine 100''' (system) for use in generating electricity from an underwater ocean stream (e.g., the gulf stream off the coast of Florida). Some of the features of the underwater turbine 100'' are similar to the features of the underwater turbine 100 in FIGS. 1-4B, underwater turbine 100' of FIGS. 5-6, and underwater turbine 100'' of FIGS. 7-8. Thus, reference numerals used to designate the various components of the underwater turbine 100'' are identical to those used for identifying the corresponding components of the underwater turbine 100 in FIGS. 1-4B, underwater turbine 100' of FIGS. 5-6, and underwater turbine 100'''' of FIGS. 7-8, except that a "'''" has been added to the end of the numerical identifier. Therefore, the structure and description for the various features of the underwater turbines 100, 100', and 100'' and how they are operated and controlled are understood to also apply to the corresponding features of the underwater turbine 100''', except as described below.

The underwater turbine 100'''' includes an upper pontoon 110''' and a lower pontoon 120'' interconnected by a pylon structure 130''', and a propeller assembly 140'' with multiple (e.g., three) blades 145''' attached to the lower pontoon 120''''. The upper pontoon 110''', the lower pontoon 120''', and the pylon structure 130'' are aligned on an intersecting axis (e.g., an axis or plane would intersect each of the upper pontoon 110'', lower pontoon 120''', and the pylon structure 130'''). The blades 145''' are rotated about an axis of the lower pontoon 120''' by a force exerted by an underwater stream S (e.g. underwater ocean stream) on the propeller assembly 140'''. The upper pontoon 110''' and lower pontoon 120''' have rounded edges to advantageously reduce drag forces on the system 100'''' (e.g., the upper pontoon 110''' and lower pontoon 120'' have circular transverse cross-sections). The upper pontoon 110''' and lower pontoon 120''' can also be made of the same material. The blades 145''' can also be made of the same material as the upper pontoon 110''' and the lower pontoon 120'''. For example, in one implementation the upper pontoon 110''', the lower pontoon 120'', and the blades 145'' can be made of concrete. Advantageously, making the blades 145''' from concrete allows the blades to withstand greater underwater compressive forces. Additionally, in one example, the upper pontoon 110'' can be spaced apart from the lower pontoon 120''' by approximately 10 meters. In one example, the upper pontoon 110''' and the lower pontoon 120'''' can have an outside diameter of approximately 1 m. In one example, the blades 145''' can have a radius or length of 7 to 8 meters (e.g., measured from the hub of the propeller assembly 140'''). Furthermore, in some examples, the blades 145''' are capable of folding (see FIGS. 14A-14D, discussed below), advantageously facilitating the transportation of the underwater turbine 100'''. Advantageously, the size of the underwater turbine 100''' avoids placing a substantial (e.g., high) velocity gradient across the underwater turbine 100'' to improve stability of the underwater turbine 100''' in the ocean. The size of the underwater turbine 100'' also decreases the amount of stress or load on the propeller assembly 140''' during operation.

Figure 10A:
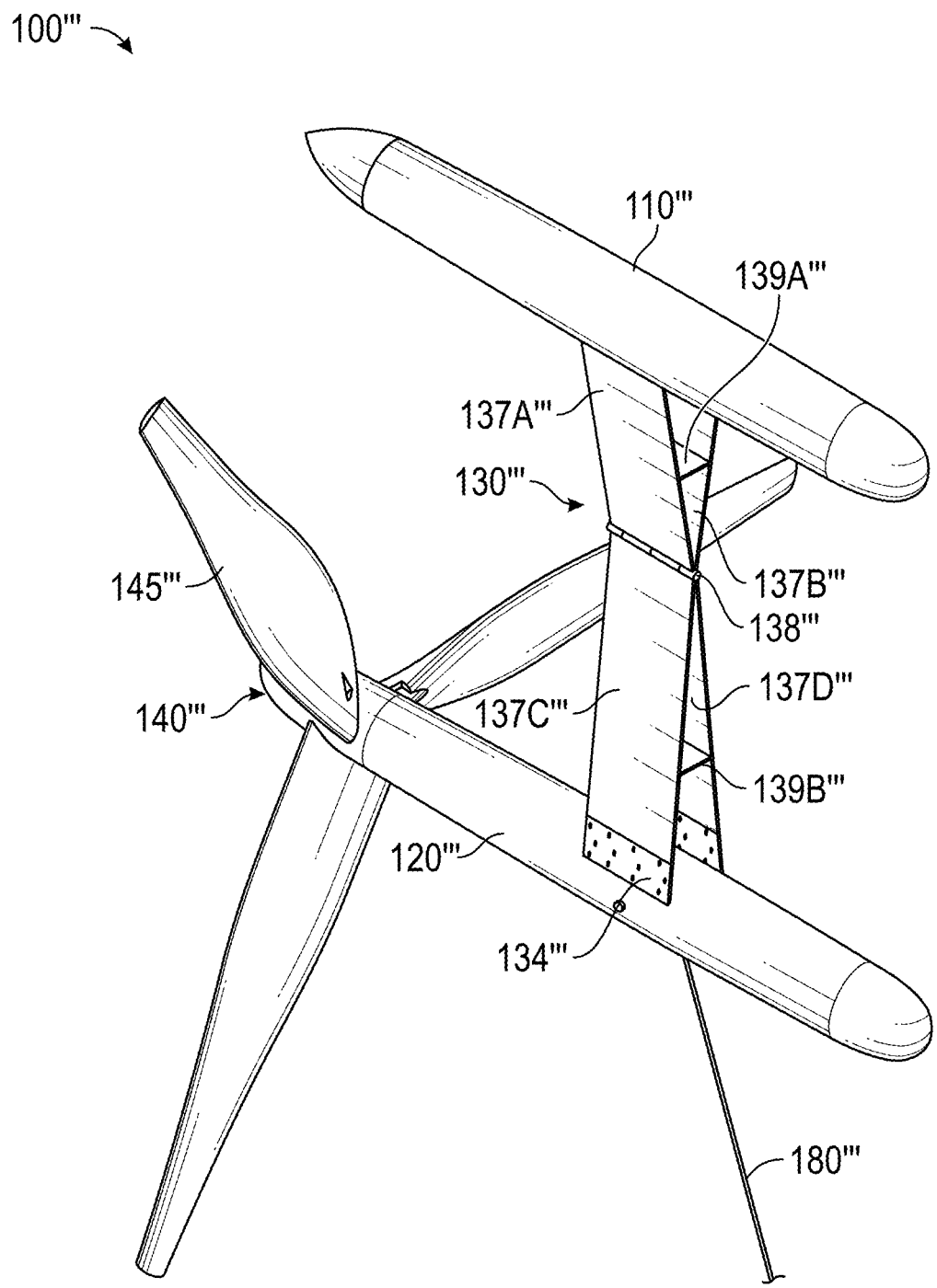
FIG. 10A is a schematic perspective view of another underwater turbine for generating electricity from an ocean stream.
Figure 10B:
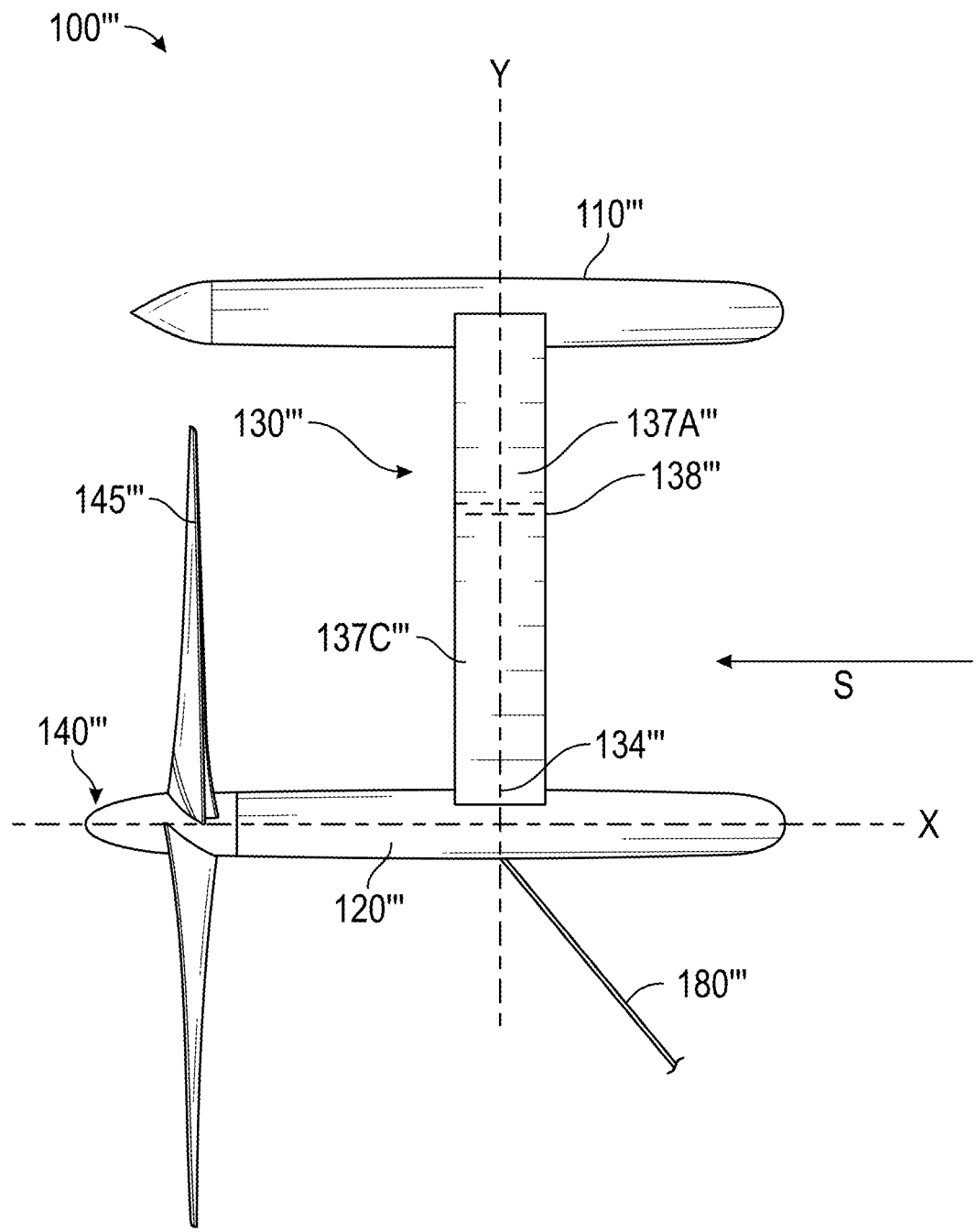
FIG. 10B is a schematic side view of the underwater turbine in FIG. 10A.

With continued reference to FIGS. 10A-10B, the pylon structure 130'' can include connecting plates 137A'', 137B''', 137C''', 137D'' (e.g., sheet metal plates, etc.) arranged in an X-formation or triangular formation to connect the upper pontoon 110''' to the lower pontoon 120'''. For example, connecting plates 137A'''' and 137B''' are connected to the upper pontoon 110'' at a first, upper end (e.g., via fasteners 134'''—similar to fasteners 134 in FIGS. 1C-1D), and the connecting plates 137A'' and 137B'' are coupled to a pin 138''' at a second, lower end in a triangular formation.

Additionally, the connecting plates 137C''' and 137D''' are connected to the pin 138''' at a first, upper end, and the connecting plates 137C''' and 137D'' are connected to the lower pontoon 120''' at a second, lower end (e.g., via fasteners 134'''—similar to fasteners 134 in FIGS. 1C-1D) in a triangular formation. The connecting plates 137A''', 137B'''', 137C''', 137D''' can rotate about the pin 138'''. Connecting plates 137A''' and 137B'''' can be supported by an interconnecting plate 139A''' and connecting plates 137C''' and 137D'' can be supported by an interconnecting plate 139B'''. Advantageously, the interconnecting plates 139A''' and 139B'''', and ability to rotate about the pin 138'''' inhibits (e.g., prevents) the connecting plates 137A''', 137B'''', 137C''', 137D''' from buckling under load. Additionally, the connecting plates 137A'''', 137B'', 137C''', 137D'' are thin, for example be between 2 mm to 5 mm in thickness, which can facilitate or improve the hydrodynamics of the underwater turbine 100''. The underwater turbine 100'''' is buoyant, with the upper pontoon 110''' providing at least 50% (e.g., 60%, 70%, 100%) of the buoyancy for the underwater turbine 100''' and applying a buoyant force B (see FIG. 11B) on the underwater turbine 100'''. Advantageously, due to the pylon structure 130''', water can pass through an opening between connecting plates 137A'''' and 137B'' and connecting plates 137C''' and 137D'' (e.g., to reduce an effect of current forces acting on the underwater turbine 100''').

Figure 11A:
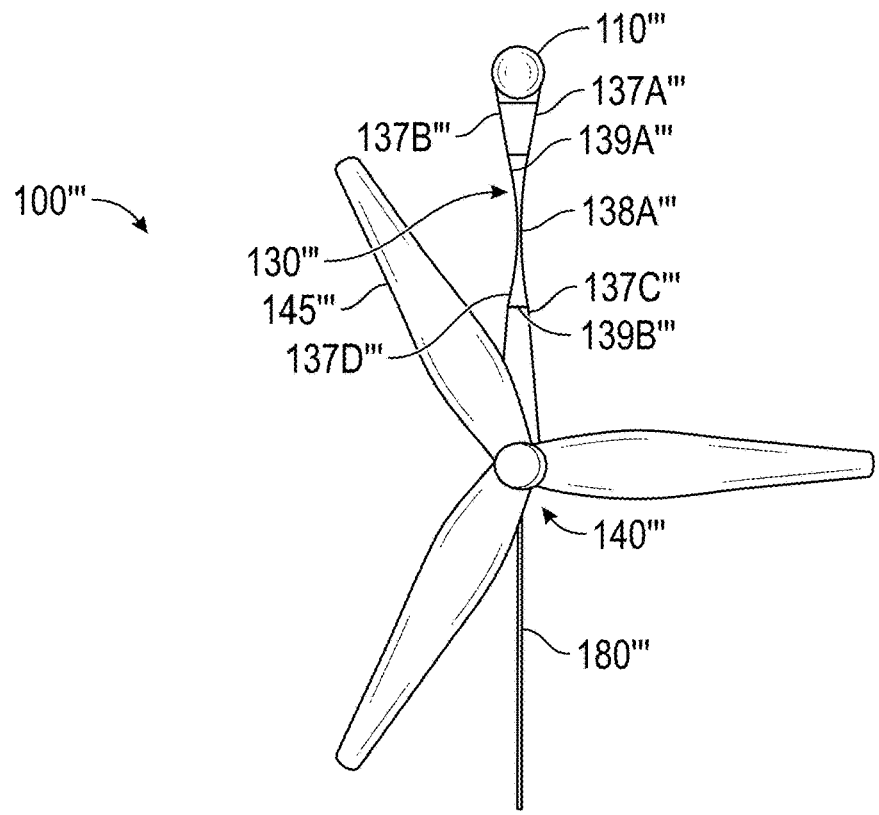
FIG. 11A is a schematic front view of the underwater turbine in FIG. 10A.
Figure 11B:
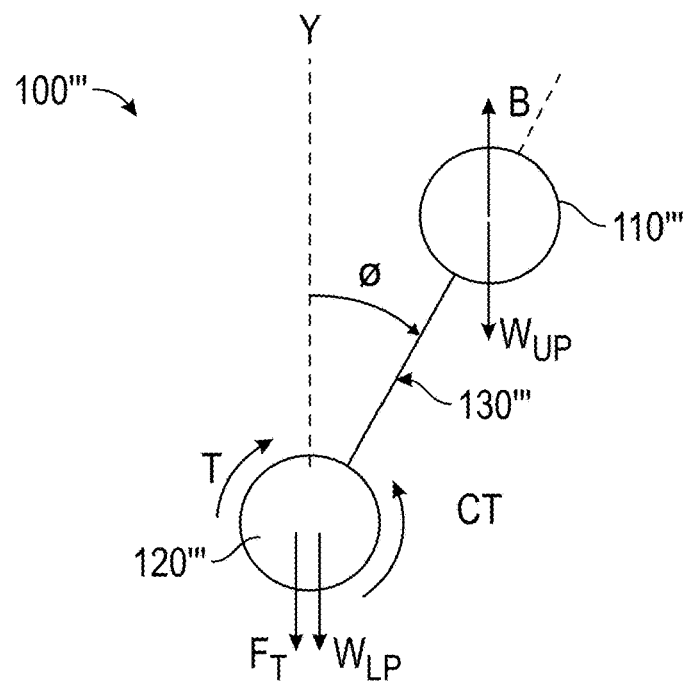
FIG. 11B is a schematic view of the underwater turbine in FIG. 10A.
Figure 11C:
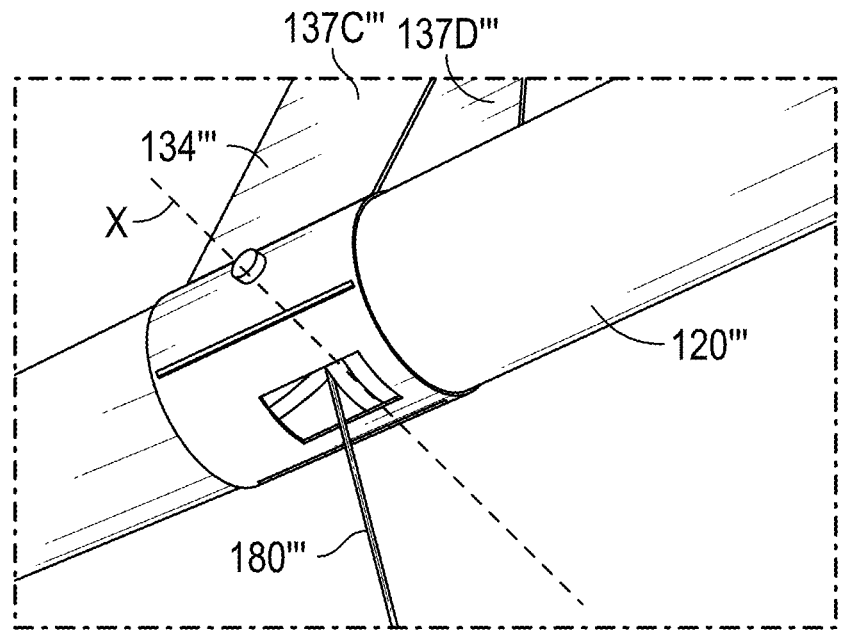
FIG. 11C is a schematic partial view of a bottom pontoon of the underwater turbine for generating electricity from an ocean stream in FIG. 10A.

With reference to FIGS. 11A-11C, one advantage of the underwater turbine 100'''' is that the upper pontoon 110'' automatically applies a counter torque CT or counter moment (e.g., in the counterclockwise direction in FIG. 11B) on the underwater turbine 100'''' that balances against a torque T or moment M (e.g., in the clockwise direction in FIG. 11B) applied on the underwater turbine 100''' by the rotation of the propeller assembly 140''' (e.g., due to the force applied on the propeller assembly 140''' by the underwater stream). The weight of upper pontoon 110''' (e.g., weight Wup) is exerted (e.g., positive Y-direction) in an equal and opposite Y-direction (e.g., negative Y-direction) of the buoyant force B. The lower pontoon 120'' has a weight (e.g., weight Wlp) which is exerted in the same direction as the weight Wup of the upper pontoon 110''' (e.g., the positive Y-direction). The underwater turbine 100'' can reach an equilibrium orientation where the counter torque CT is balanced against the torque T, and this equilibrium orientation results in the pylon structure 130''' being angled away from the vertical axis Y by an angle ϕ. Additionally, the counter torque CT or counter moment applied by the upper pontoon 110''' self-adjusts so that the angle ø can vary depending on the amount of torque T applied by the rotation of the propeller assembly 140''' (e.g., due to a change in rotation speed caused by a change in speed of the underwater stream S). For example, the greater the torque T the rotation of the propeller assembly 140''' applies on the lower pontoon 120'', the greater the counter torque CT applied by the upper pontoon 110'''' to achieve equilibrium and the greater the angle ϕ that the pylon structure 130'''' extends relative to vertical. Similarly, the smaller the torque T the rotation of the propeller assembly 140'''' applies on the lower pontoon 120''', the smaller the counter torque CT applied by the upper pontoon 110''' to achieve equilibrium and the smaller the angle ϕ that the pylon structure 130'''' extends relative to vertical. Accordingly, the upper pontoon 110''' facilitates (e.g., assists) in maintaining the underwater turbine 100''' in an equilibrium orientation during operation and inhibits a roll motion of the lower pontoon 120'' about the X-axis (see FIG. 10B). Additionally, the automatic counter torque CT or counter moment applied by the upper pontoon 110''' to counter the torque T or moment applied by the rotation of the propeller assembly 140''' advantageously allows for the underwater turbine 100'' to only have one propeller assembly 140''' (e.g., the system does not need to have a second propeller assembly 140 rotating in an opposite direction to counter the torque or moment applied by the first propeller assembly 140), therefore advantageously resulting in a simpler system and reducing cost of manufacture, maintenance and operation of the underwater turbine 100''''.

Another advantage of the underwater turbine 100'''' is that the upper pontoon 110'''' is buoyant and applies an upward force B (e.g., buoyant force) in a vertical direction (e.g., negative Y-direction) on the pylon structure 130''' and the lower pontoon 120'''. The lower pontoon 120''' is attached to a cable 180'' which is attached to a mooring weight which applies a force FT (e.g., tension force) on the lower pontoon 120''' and the pylon structure 130''' in an opposite direction of the upper pontoon 110'' (e.g., a downward or positive Y-direction). Therefore, the pylon structure 130'' is maintained under tension due to the buoyant force B and the tension force FT from the upper pontoon 110''' and the lower pontoon 120''', respectively. Furthermore, since the pylon structure 130'' is in a triangular formation, where the connecting plates 137A''', 137B'' are connected with the connecting plates 137A''', 137B'''' at a rotating pin 138''', the pin 138''' is able to transfer the load (e.g., buoyant force B, tension force FT) through axial loading along the connecting plates 137A'''', 137B'''', 137C''', 137D'''. Additionally, the pylon structure 130''' being under tension is advantageous and facilitates keeping the underwater turbine 100'' in the equilibrium orientation during operation. Furthermore, since the pin 138''' is rotatable, the pylon structure 130'' will not buckle, which permits the pylon structure 130''' to be thin sheets of metal (e.g., steel, aluminum, etc.). Additionally, since the pylon structure 130''' is maintained under tension, any torque T applied on the underwater turbine 100''' by the rotation of the propeller assembly 140'' is transferred through the pylon structure 130'' (e.g., the sheets of thin, hydrodynamic metal connecting plates 137A'', 137B'', 137C''', 137D'') to the upper pontoon 110'' which balances the forces automatically by a counter torque. Therefore, the underwater turbine 100'''' can reach an equilibrium orientation. Advantageously, due to the pylon structure 130'' (e.g., the triangular formation of the pylon structure 130'''), bending moments exerted on the underwater turbine 100''' are minimized and tension FT and buoyant B forces are optimized in a loading direction (e.g., Y-direction).

Figure 12:
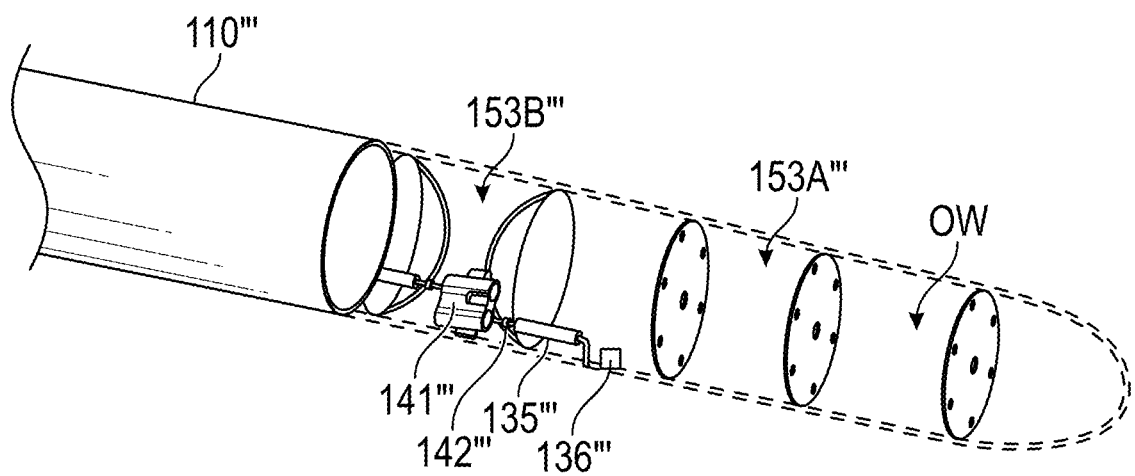
FIG. 12 is schematic partial view of an upper pontoon of the underwater turbine for generating electricity from an ocean stream in FIG. 10A.

FIG. 12 shows the upper pontoon 110'', where the upper pontoon 110''' has a first chamber 153A''' (e.g., front water chamber) and a second chamber 153B''' (e.g., dry chamber). The first chamber 153A''' can be hollow, at ambient pressure (e.g., atmospheric pressure) and be operably connected to a well pump 135'''. The well pump 135''' can be selectively operated to supply water OW into the first chamber 153A''' to increase the weight of the upper pontoon 110''' (e.g., decreasing the buoyancy of the underwater turbine). Additionally, the well pump 135''' can drain water OW from the first chamber 153A''' to decrease the weight of the upper pontoon 110'' (e.g., increase the buoyancy of the underwater turbine). Therefore, the upper pontoon 110'' has a variable buoyancy which can allow the underwater turbine 100''' to be raised to a shallower depth or surface (e.g., be raised to the top of the ocean) or to sink to a lower depth or dive. Advantageously, the upper pontoon 110''' having a variable buoyancy minimizes stress on the underwater turbine 100''' and the propeller assembly 140''' since the underwater turbine 100''' can avoid high ocean currents by changing the buoyancy of the upper pontoon 110''' to avoid the high ocean currents (e.g., by flooding the upper pontoon 110'''' with water to lower the underwater turbine 100''' or by draining water from within the upper pontoon 110'' to increase its buoyancy and raise the underwater turbine 100'''). Additionally, having an upper pontoon 110''' with a variable buoyancy avoids the need for having a sophisticated blade pitch control at the propeller assembly 140''' since the buoyancy of the upper pontoon 110''' allows the underwater turbine 100'' to avoid high currents (e.g., by increasing or decreasing the buoyancy to raise or lower the underwater turbine 100''). That is, the propeller assembly 140''' can exclude a blade pitch control. Furthermore, the well pump 135''' can quickly flood (e.g., fill) the first chamber 153A''' of the upper pontoon 110''' to change (e.g., reduce) the buoyancy of the upper pontoon 110'' so that the underwater turbine 100'''' can sink to rapidly avoid fast ocean currents.

With continued reference to FIG. 12, the well pump 135''' can be operatively connected to a magnetic coupler 142''' and an electric motor 141'''. The magnetic coupler 142''' and the electric motor are within the second chamber 153B''' and kept dry (e.g., are in a dry chamber). Operation of the well pump 135''' can be automatically controlled by an electronic controller 136''' coupled to the electric motor 141''', which controls the operation of the well pump 135''' via the magnetic coupler 142''' based at least in part by sensors of the underwater turbine (e.g., gyroscopes or tilt sensors that sense the tilt of the underwater turbine 100''', speed or flowrate sensors that measure the speed of the underwater current, sensors that sense one or more parameters of the operation of the components in the underwater turbine 100'''). Advantageously, the ability to supply water OW to the first chamber 153A''' with the pump can alter the center of buoyancy of the underwater turbine 100'''. Altering the center of buoyancy can allow for active pitch control of the upper pontoon 110'''. For example, altering the center of buoyancy can maintain the upper pontoon 110''' with the underwater stream S (e.g., maintain the upper pontoon 110''' in a horizontal orientation X) and inhibits (e.g., prevents, corrects, compensates for) a pitch motion of the upper pontoon 110'''. Since the stream S is non-uniform along the upper pontoon 110''' and the underwater turbine 100''', actively adjusting the pitch allows the underwater turbine 100''' to maintain a desired position (e.g., align the upper pontoon 110''' with the direction of the stream S).

Although not shown in FIG. 12, the upper pontoon 110'' can also include a third chamber (e.g., rear water chamber) and a fourth chamber (e.g., rear dry chamber) at the opposite end of the upper pontoon 110''' (e.g., opposite the chambers 153A''' and 153B'''' shown in FIG. 12). The third chamber can be hollow, at ambient pressure (e.g., atmospheric pressure) and be operably connected to an additional well pump (not shown). The additional well pump can be selectively operated to supply water OW into the third chamber to increase the weight of the upper pontoon 110''' (e.g., decreasing the buoyancy of the underwater turbine) in addition to the first chamber 153A''' connected to the well pump 135'''. The additional well pump can also drain water OW from the third chamber to decrease the weight of the upper pontoon 110'''. For example, when the first chamber 153A''' and the third chamber are both supplied (e.g., filled) with water from the respective well pumps (e.g., well pump 135''') the weight of the upper pontoon 110'' increases to lower the underwater turbine 100'' in the ocean. Additionally, when water is drained from first chamber 153A''' and the third chamber, the weight of the pontoon 110'' decreases and can exert a greater buoyant force B on the underwater turbine 100''' to raise the underwater turbine 100'''' in the ocean. Furthermore, when the first chamber 153A''' is filled and the third chamber is drained (e.g., unfilled) the front portion of the upper pontoon 110''' is heavier than the rear portion, which causes the pitch of the upper pontoon 110''' relative to horizontal (e.g., X-axis, longitudinal axis) to be negative (e.g., the upper pontoon 110''' tilts downwards so the front portion is lower than the rear portion of the upper pontoon 110''). In another example, when the first chamber 153A'''' is unfilled (e.g., drained) and the third chamber is filled, the rear portion of the upper pontoon 110'' will be heavier than the front portion, which causes the pitch of the upper pontoon 110'' relative to a horizontal (e.g., X-axis, longitudinal axis) to be positive (e.g., the upper pontoon 110''' tilts upwards so the front portion is higher than the rear portion of the upper pontoon 110''). Advantageously, having an upper pontoon 110''' with a first chamber 153A''' and a third chamber coupled to well pumps (e.g., well pump 135'''), the underwater turbine 100''' has a pitch control via the upper pontoon 110''' that can be actuated to control or maintain alignment of the underwater turbine 100'' with the underwater stream S (e.g., by counteracting pitch forces exerted on the underwater turbine 100''').

The underwater turbine 100''' can also be controlled based on the velocity of the underwater stream S or based on a forecast (e.g., prediction) of the underwater stream S velocity. For example, the underwater turbine 100''' can be raised or lowered in the ocean to an ideal operating environment, where the ideal operating environment can be an underwater stream S with a current of between 1.25 m/s-1.5 m/s, such as 1.35 m/s. When the underwater turbine 100''' needs to be raised or lowered in the ocean to find the ideal underwater current S, one or more of the well pumps (e.g., well pump 135''') can fill or drain the upper pontoon 110''' to change the weight (e.g., Wup) and buoyancy force B of the upper pontoon 110'''. Advantageously, a predictive model or a predictive controller (e.g., controller 136 or controller 136''' which can be a predictive AI controller) can determine and/or forecast the optimal current velocity (e.g., 1.35 m/s) based on underwater current streaming data at a past and/or present time. For example, the underwater current streaming data can be sent to a predictive model (e.g., a predictive artificial intelligence model), where the predictive AI model can forecast the future current of the underwater stream S at any ocean depth. For example, the predictive AI model can forecast the current profile of the underwater stream S at a 100 m depth 45 minutes in the future. Therefore, based on the forecast of the velocity of underwater stream, the predictive controller (e.g., controller 136 or controller 136''' which can be a predictive AI controller), driven by the predictive AI model, can adjust the buoyancy of the upper pontoon 110''' of the underwater turbine 100''' to raise or lower the underwater turbine 100''' to the desired depth for optimal performance of the underwater turbine 100'''. The predictive controller can be operatively coupled to the one or more well pumps (e.g., well pump 135''') in order to change (e.g., automatically) the depth (e.g., increase or decrease buoyancy force B) of the underwater turbine 100''' in light of the forecasted underwater stream S velocity. Advantageously, raising and lowering the underwater turbine 100''' based on the predictive controller can maximize the capacity factor (e.g., electrical energy output of the underwater turbine 100''') and minimize stress on the underwater turbine 100'''. The underwater turbine 100''' can also have a digital twin (e.g., a virtual representation of the underwater turbine 100''') driven by AI or a deep learning model to remotely monitor the structural integrity of the underwater turbine 100''' (e.g., monitor the structural integrity of the one or more of the lower pontoon 120''', pylon structure 130''', propeller assembly 140' and upper pontoon 110''', such as by monitoring stress loads on these components), optimize the parameters of underwater turbine 100''', and improve blade 145''' efficiency. For example, the AI driven digital twin can enable the optimization of the blades 145''' by determining the optimal chord and pitch angle distribution of the blades 145''' based on the ocean conditions and load on the underwater turbine 100'''. Additionally, the AI driven digital twin can optimize the efficiency of the underwater turbine 100''' by determining an optimal buoyancy force B for the upper pontoon 110''', determining the optimal length of the blades 145''', and determining the optimal or ideal current velocity of underwater stream S at a particular depth. After determining the optimal conditions of the underwater turbine 100''' with the AI driven digital twin, new operating conditions (e.g., buoyancy force B of the upper pontoon 110''') can be achieved for the underwater turbine 100'''. The AI driven digital twin can also determine the maximum allowable deflection ranges and the minimum and maximum stress loads which can be exerted on the blade 145''' at a particular underwater current S and depth, which can improve the longevity (e.g., lifespan) of the blade 145''' and the underwater turbine 100'''. One of skill in the art will recognize that controller described above (e.g., AI controller, AI digital twin) can also be applied to the underwater turbine 100 of FIGS. 1-4B, the underwater turbine 100' of FIGS. 5-6, and the underwater turbine 100'' of FIGS. 7-8.

Figure 13A:
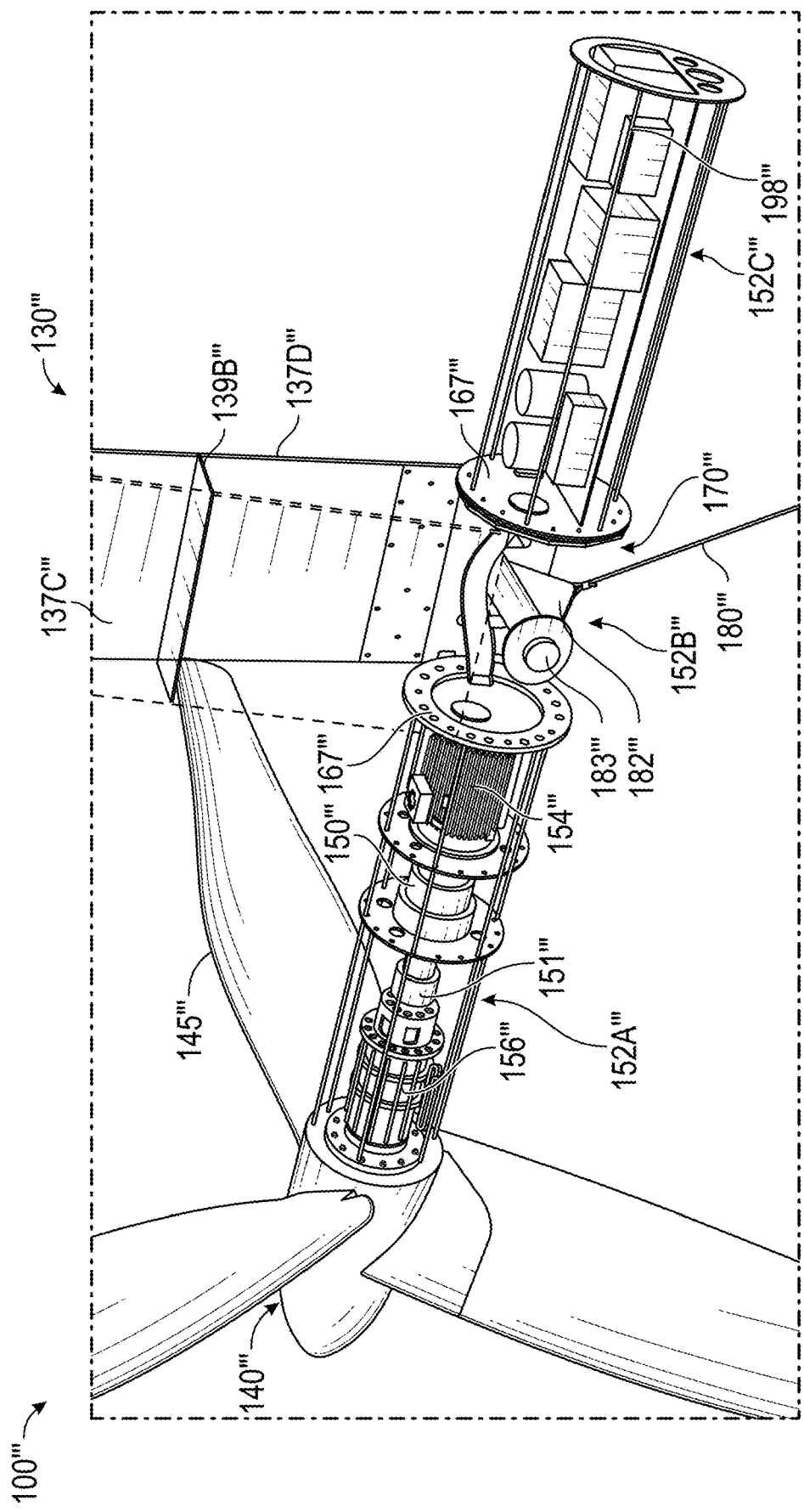
FIG. 13A is a schematic partial side view of the internal components of the bottom pontoon of the underwater turbine for generating electricity from an ocean stream in FIG. 10A, the outer housing of the bottom pontoon excluded.
Figure 13B:
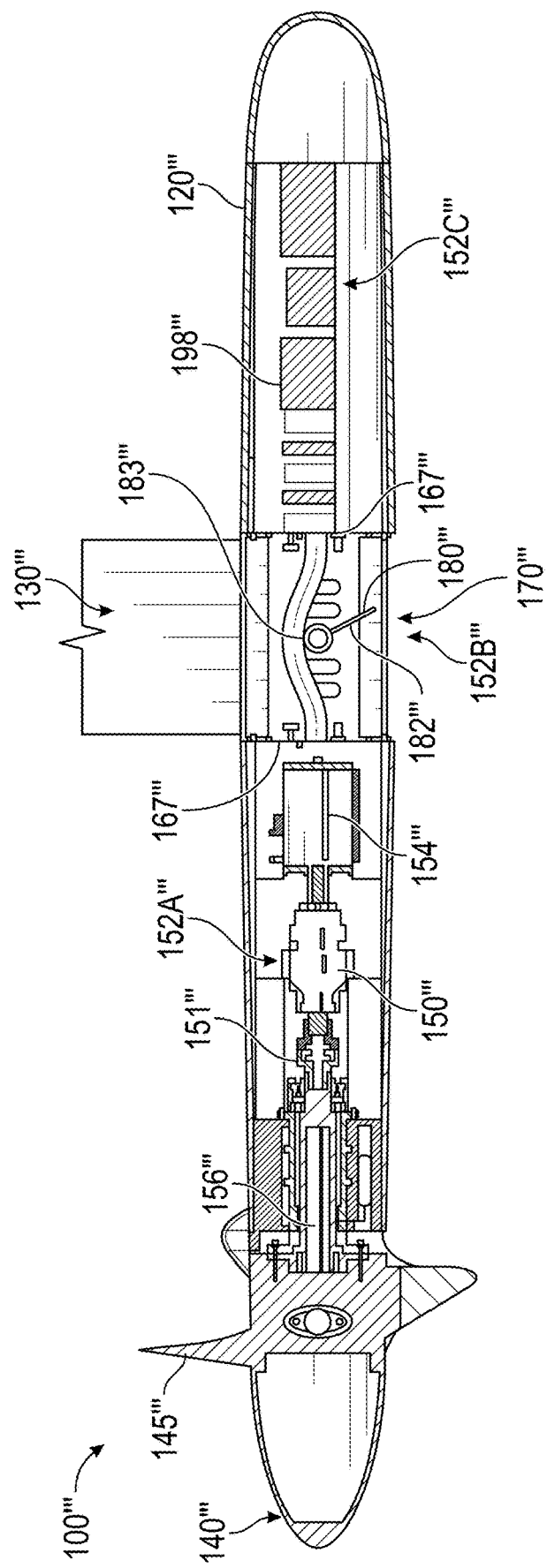
FIG. 13B is a schematic partial cross-sectional side view of a bottom pontoon of the underwater turbine for generating electricity from an ocean stream in FIG. 10A.
Figure 14C:
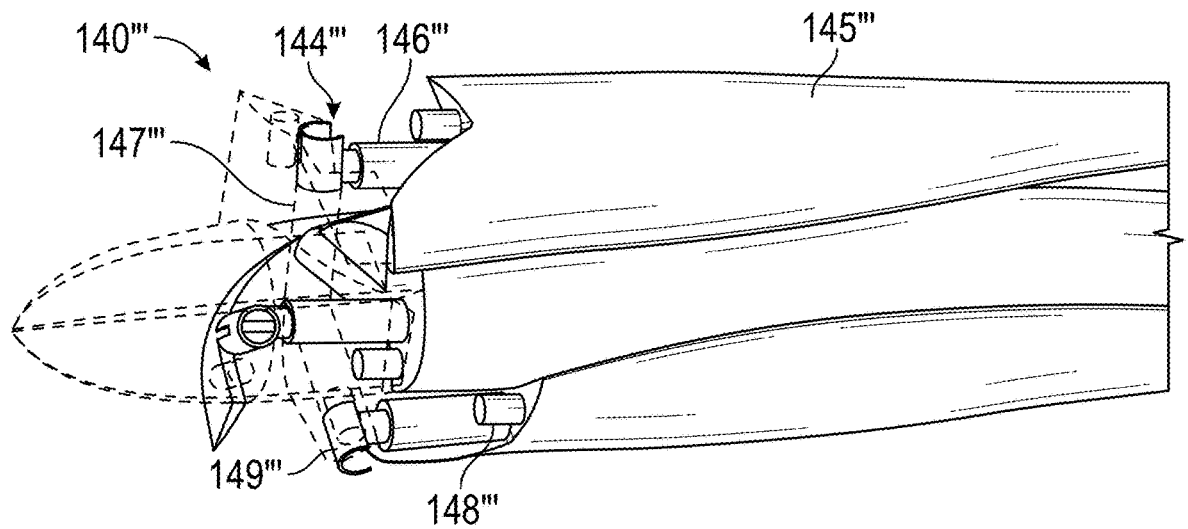
FIG. 14C is a schematic end view of the folded blades of the propeller assembly for the underwater turbine for generating electricity from an ocean stream in FIG. 10A.
Figure 14D:
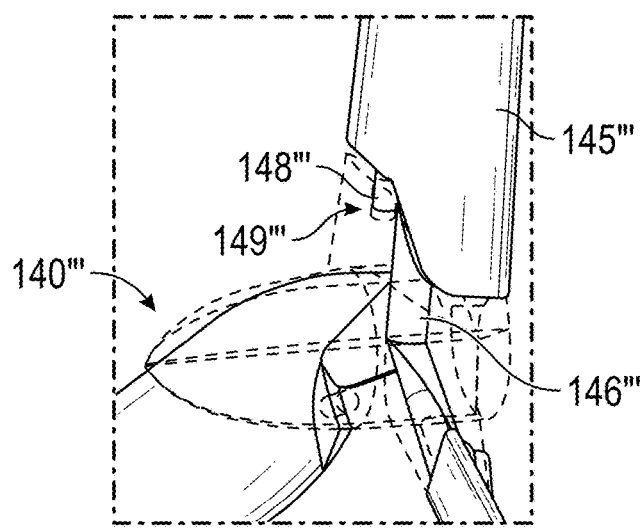
FIG. 14D is a schematic end view of the unfolded blades of the propeller assembly for the underwater turbine for generating electricity from an ocean stream in FIG. 10A.

FIGS. 13A and 13B show the components in the lower pontoon 120'' of the underwater turbine 100'''' connected to the propeller assembly 140'', and excludes the outer housing of the lower pontoon 120''' to illustrate the components. The underwater turbine 100'' includes a first compartment 152A''', a second compartment 152B''', and a third compartment 152C'''. The first compartment 152A''' includes a shaft 156'' which is coupled to a bearing 151''', a generator 150''' (e.g., electric motor-generator), and an electric motor 154'''. The generator 150''' (e.g., electric motor-generator) can include a variable frequency drive that allows it to operate at different speeds. Though not shown, one or more power cables can be connected to the generator 150''' via which the generated electricity is transmitted from the underwater turbine 100'''. The electric motor 154''' can be operated by using power generated by the generator 150'''. During operation, the rotation of the propeller assembly 140''' (e.g., caused by the stream S) rotates the shaft 156''', which rotates one portion (e.g., armature, rotor) of the generator 150'' relative to another portion (e.g., stator) of the generator 150'' to generate electricity. The first compartment 152A''' and the third compartment 152C''' can be filled with air, which can provide an amount of buoyancy to the lower pontoon 120'''. Alternatively, the first compartment 152A''' and the third compartment 152C''' can be filled with oil (e.g., biodegradable oil). The components within the first compartment 152A'' (e.g., bearing 151''', generator 150''', and electric motor 154''') can effectively operate within the oil filled first compartment 152A'''.

With continued reference to FIGS. 13A and 13B, the first compartment 152A''' is spaced and separated from the second compartment 152B''' by a membrane 167''' (e.g., rubber membrane, one or more membranes). The third compartment 152C'''' is spaced and separated from the second compartment 152B''' by another membrane 167''' (e.g., rubber membrane). The membrane 167''' is configured prevent leakage of oil from the first compartment 152A''' into the second compartment 152B'''' and from the third compartment 152C''' to the second compartment 152B'''. Advantageously, the rubber membrane 167''' can equalize pressure in the first compartment 152A''' and the third compartment 152C''' to ensure little to no oil (e.g., biodegradable oil) leakage from the first compartment 152A''' and the third compartment 152C'''. Additionally, a well can be positioned through the first compartment 152A''', second compartment 152B''', and the third compartment 152C''' to effectively utilize the space within each chamber (e.g., to maintain pressure). The third compartment 152C''' can include a plurality of weights 198''' to change the weight (e.g., weight Wlp) of the lower pontoon 120''.

The pitch control mechanism 170''' of the underwater turbine 100'''' (e.g., which can include the well pump 135''' operatively connected to a magnetic coupler 142''' and an electric motor 141''' in the upper pontoon 110''' as discussed above) can have a hinge 183''', a rigid plate 182''', and a cable 180'''. The cable 180'' can be connected to a mooring weight (e.g., mooring weight A in FIG. 9A) disposed on the ocean floor and can include a first portion coupled to the rigid plate 182''' and a second portion coupled to the mooring weight. The cable 180''' can couple to the rigid plate 182''' via an opening on the rigid plate 182''' so that the cable 180''' connected at the opening is centered with the midline of the lower pontoon 120'', midline of the pylon structure 130'', and midline of the propeller assembly 140'''. The rigid plate 182''' can be connected to the hinge 183''', which is operably coupled to a portion of the shell of the lower pontoon 120'' (e.g., in the second compartment 152B'''). Therefore, when the rigid plate 182''' changes in orientation (e.g., to maintain the lower pontoon 20 aligned with the underwater stream S, in the horizontal position), the rigid plate 182''' will rotate about the hinge 183''' (e.g., rotate toward the front end of the lower pontoon 120'' or rotate toward the rear end of the lower pontoon 120'''). Additionally, the rigid plate 182''' has a thin profile in one direction, but a wide profile in a second direction), advantageously allowing the rigid plate 182''' to pivot about the axis of the hinge 183''', but inhibiting (e.g., preventing) the rigid plate 182''' from pivoting in a transverse direction (e.g., pivot in a widthwise direction of the lower pontoon 120'''). In one implementation, the pitch control mechanism 170'' can include a piston that actuates the orientation of the rigid plate 182''' (e.g., piston 184 in FIGS. 3, 4). In another implementation, the piston is excluded and the rotation of the rigid plate 182'''' about the axis of the hinge 183''' is passive (e.g., not actuated, where pitch control is affected by the well pump 135''' operatively connected to a magnetic coupler 142'' and an electric motor 141''' in the upper pontoon 110''' as discussed above).

FIGS. 14A-14D shows the underwater turbine 100''', where the blades 145''' are folded to fit into a storage container or compartment C (e.g., storage and/or shipping container during transit to the deployment location for the underwater turbine 100'''). Advantageously, having the blades 145'' be foldable allows for efficient deployment and delivery of the underwater turbine system 100'' by reducing the number of large components. Additionally, by reducing the number of large components, more underwater turbines 100''' can be fit within containers C on ships, which can decrease trip and deployment costs. The blades 145''' can fold about a hinge 144''' from a folded (e.g., closed) position (see FIG. 14C) to an unfolded (e.g., extended) position (see FIG. 14D). When rotating the blades 145''' about the hinge 144''' from the folded position to the unfolded position, a tube connector 146''' coupled to the bottom or proximal end of the blade 145''' is rotated approximately 90 degrees about the hinge 144'''. When the tube connector 146''' is fully extended and rotated from a horizontal position (e.g., 90 degrees) to a vertical position (e.g., 0 degrees) in order to unfold (e.g., extend) the blades 145''', the tube connector 146'''' is concentric and/or coaxial with the tube channel 147'''. Once the blade 145''' has been rotated 90 degrees about the hinge 144" and the tube connector 146''' is concentric and/or coaxial with the tube channel 147''', the tube connector 146''' and hinge 144" can retract into the tube channel 147''' to lower and secure the blades 145''' to the propeller assembly 140" in the unfolded position. Furthermore, the blades 145" have a second connector 148''' located at the bottom or proximal area of the blades 145''' (and spaced from the tube connector 146'''') which can extend into a second channel 149" to secure the blade 145''' to the propeller assembly 140" in the unfolded (e.g., extended) position. Additionally, to rotate the blades 145''' from the unfolded position to the folded position, the hinge 144''' and the tube connector 146''' protrude (e.g., extend) from the tube channel 147''' and the second connector 148''' protrudes (e.g., extends) from the second channel 149'''. Once the hinge 144''', the tube connector 146" and the second connector 148''' are all out of (e.g., extend from) their respective channels (e.g., tube channel 147''', second channel 149''') the tube connector 146''' can rotate from the vertical (e.g., 0 degree) unfolded position to a horizontal (e.g., 90 degree) position about the hinge 144" to move the blade 145''' into a folded position.

Figure 15:
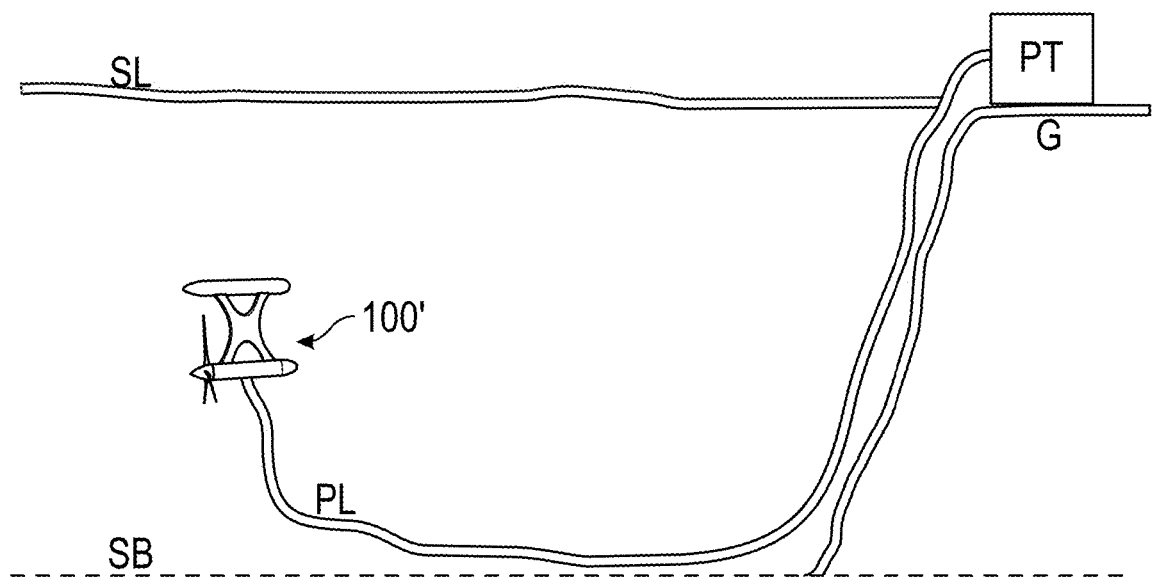
FIG. 15 is a schematic view of the underwater turbine in use to generate power.

FIG. 15 schematically shows the use of the underwater turbine 100' to generate power, which is transferred from the underwater turbine 100' via one or more power cables PL to an electric grid. For simplicity, some of the features (e.g., cable 80', mooring weight A) are excluded. The power cables PL can travel along the sea floor SB until they reach a power transfer station PT on ground to transfer the generated electricity to the electric grid. Though FIG. 15 is shown and described in connection with the underwater turbine 100', one of skill in the art will recognize that the underwater turbine 100 of FIGS. 1-4B, system 100" of FIGS. 7-8, and system 100'''' of FIGS. 10A-14D can also be operated to generate power and transfer power via the power cable(s) PL to the power transfer station PT.

Figure 16:
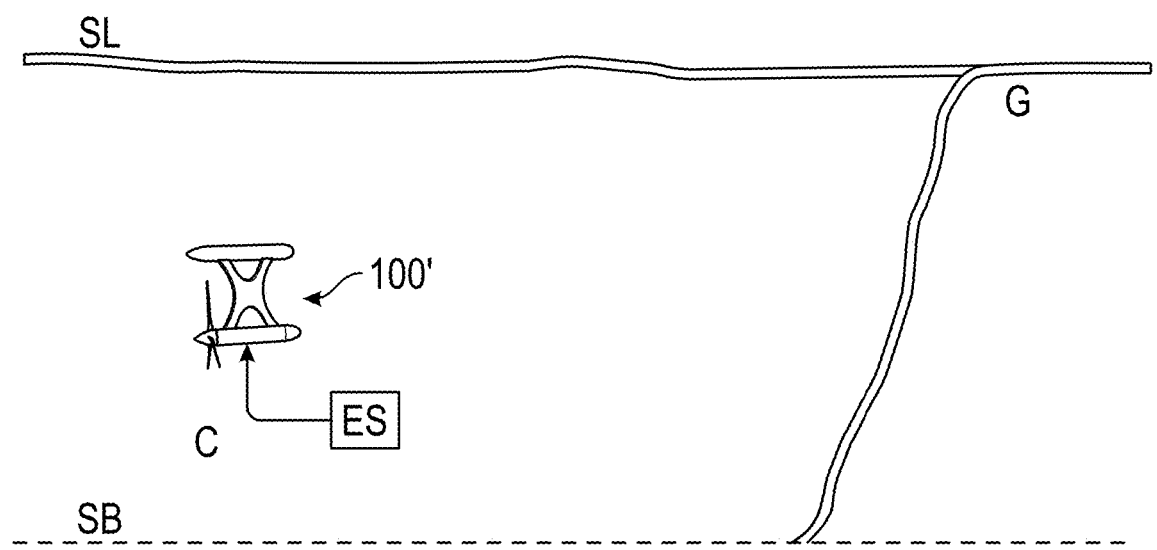
FIG. 16 is a schematic view of the underwater turbine operatively coupled to an electrolyzer system to generate hydrogen.

FIG. 16 schematically shows the use of the underwater turbine 100' to generate hydrogen via an electrolyzer system ES. For simplicity, some of the features (e.g., cable 180', mooring weight A) are excluded. Power generated by the underwater turbine 100' is transferred to the electrolyzer system ES via one or more cables 180'. Though not shown, one the hydrogen is generated by the electrolyzer, the hydrogen can be stored in a tank that can then be transported. Though the illustrated embodiment shows the electrolyzer system being underwater, one of skill in the art will recognize that the electrolyzer system can be above ground G and the cable(s) 180' extend from the underwater turbine 100' (e.g., along the sea floor SB) to the electrolyzer system located on the ground G. Though FIG. 16 is shown and described in connection with the underwater turbine 100', one of skill in the art will recognize that the underwater turbine 100 of FIGS. 1-4B, system 100" of FIGS. 7-8, and system 100''' of FIGS. 10A-14D can also be operated to generate power that is used to operate the electrolyzer unit ES to generate hydrogen, which can be stored and/or transported as discussed above.

FIGS. 17A-17D schematically show the use of the underwater turbine 100''' to generate electricity in a modular farm MF. The modular farm MF consists of a plurality of underwater turbines 100'''' arranged in a pod, each coupled to a mooring weight A via a cable 180''' (e.g., electrical cable). For example, the modular farm MF can include a pod of approximately 20 underwater turbines 100''' each coupled to a mooring weight A (see FIG. 17A). Each of the mooring weights A can be coupled to a cable PC (e.g., 100 KW electric cable at 3 kV) which can be identical to the cables (e.g., cable 180''') connected to the underwater turbine 100'''. The cables PC are each connected to a subsea junction box J. The subsea junction box J can also be connected to a static collector cable CC (e.g., 6 MW Static Collector Cable). Advantageously, the arrangement of the 20 underwater turbines 100'''' in the pod of the modular farm MF shown in FIG. 17A can generate 2 MW of power (e.g., each underwater turbine 100''' can be capable of generating 100 KW of power). In operation, rotation of the propeller assemblies of the underwater turbines 100''' generate electricity (via their respective generators that is communicated to the subsea junction box J via the cables 180''' and cable PC. Power from the pod can then be transferred from the subsea junction box J (as described below) by the static collector cable CC.

Figure 17A:
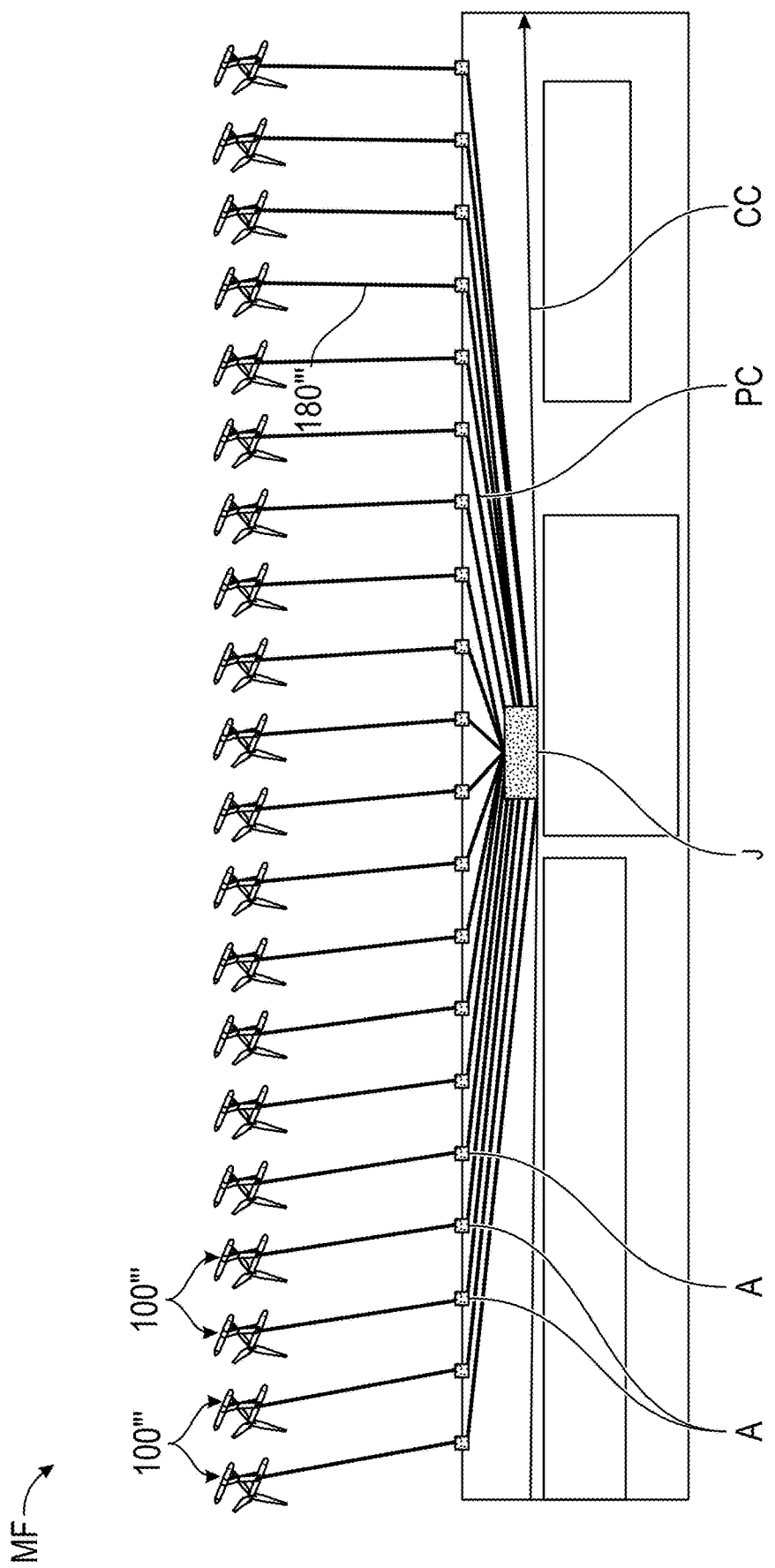
FIG. 17A is a schematic view of the underwater turbine in a modular farm layout used to generate energy.
Figure 17B:
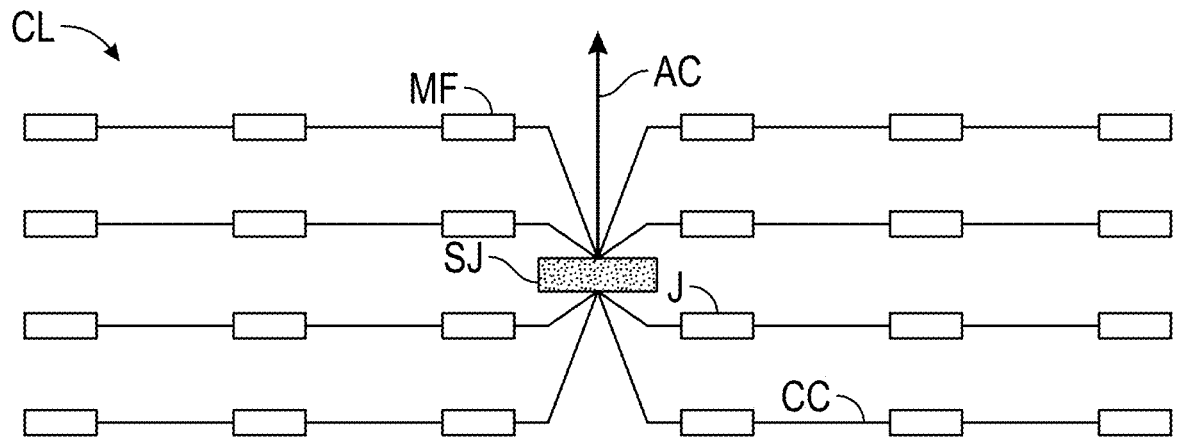
FIG. 17B is another schematic view of the underwater turbine in a modular farm layout used to generate energy.
Figure 17C:
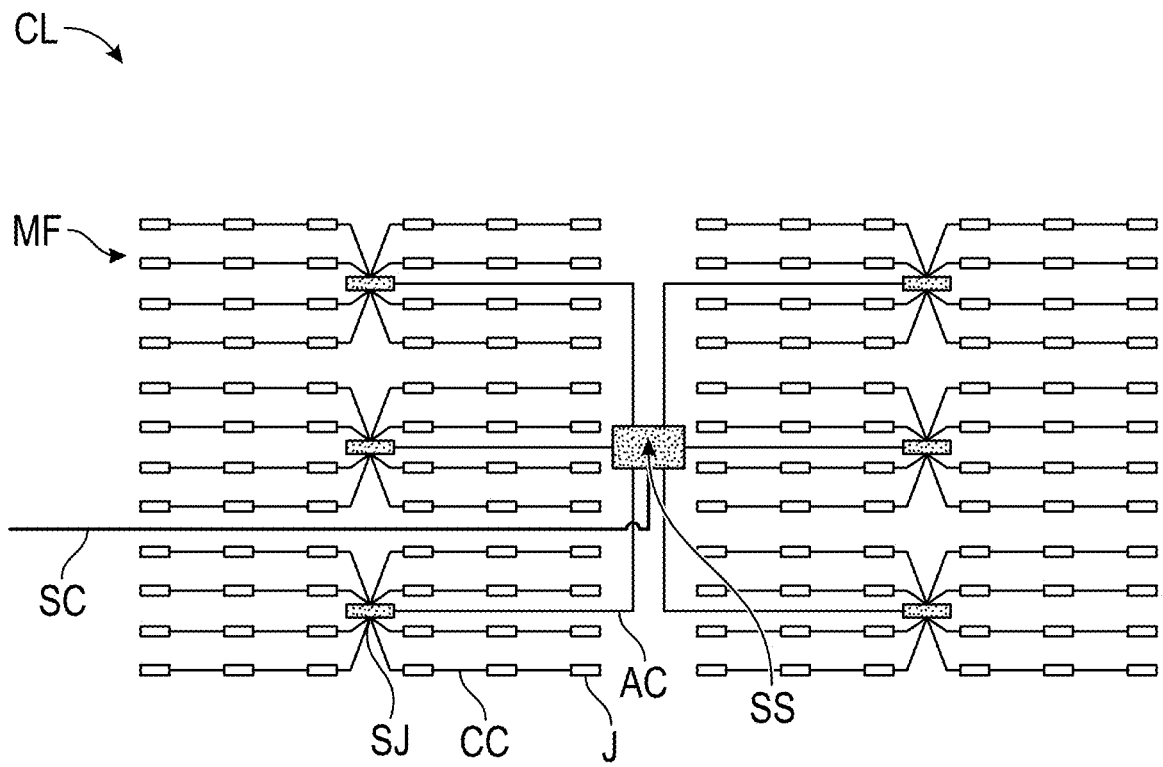
FIG. 17C is another schematic view of the underwater turbine in a modular farm layout used to generate energy.
Figure 17D:
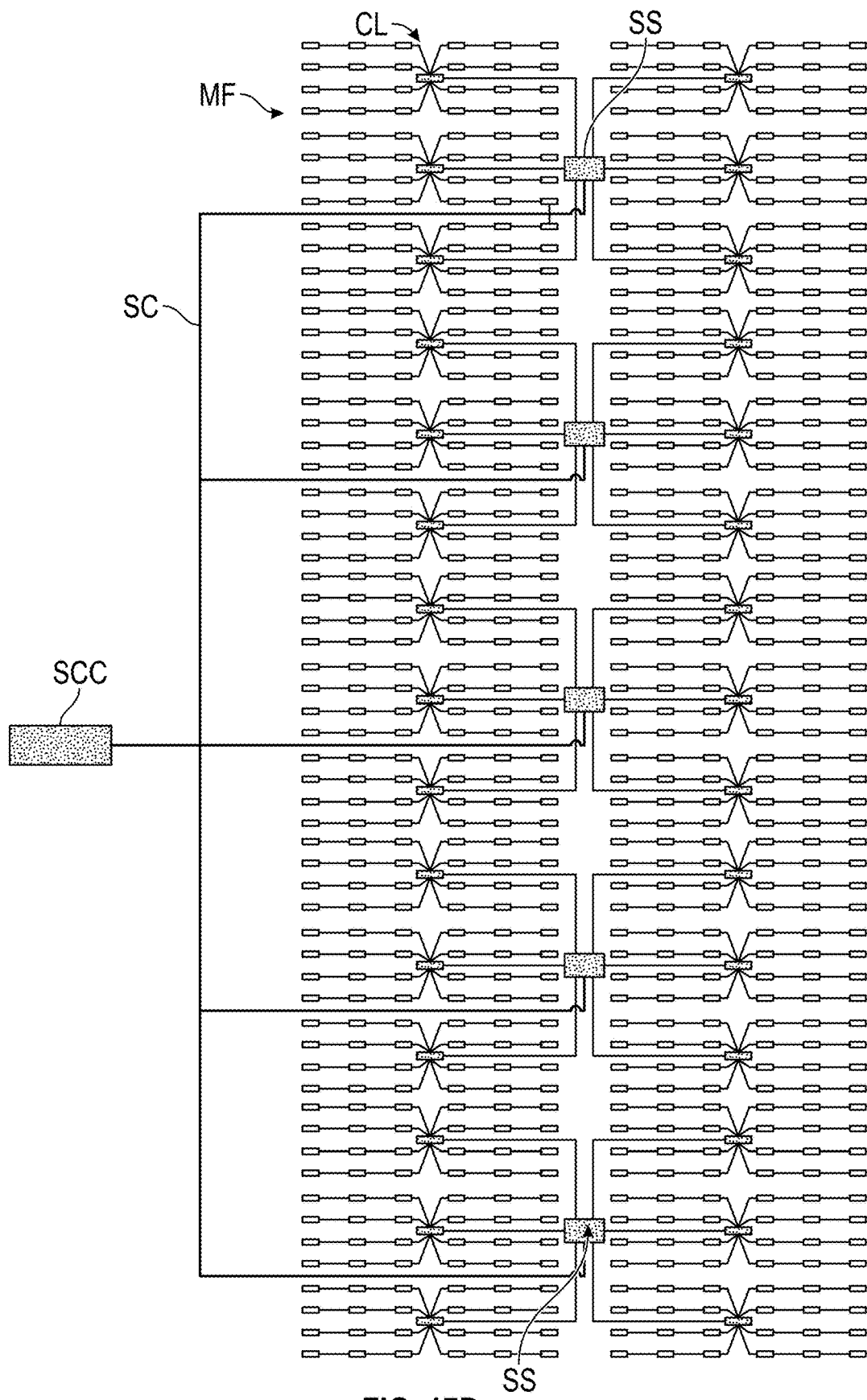
FIG. 17D is another schematic view of the underwater turbine in a modular farm layout used to generate energy.

Advantageously, the modular farm MF is scalable. For example, the modular farms MF can have multiple pods of underwater turbines 100''' arranged into a cluster CL (e.g., 24 pods in one cluster CL, each pod having 20 underwater turbines 1000''') to generate 48 MW of power (e.g., 24×2 MW per pod to generate 48 MW, see FIG. 17B). The clusters CL can be arranged in rows (e.g., six clusters CL in one row, with four total rows). Each of the rows of the clusters CL can be parallel to each other and arranged in a grid formation. The rows of clusters CL can be connected to another, larger, subsea junction box SJ via static connector cable CC. The larger subsea junction box SJ can be coupled to an aggregator cable AC. The aggregator cable AC can deliver the 48 MW of power generated by the cluster(s) CL of pods of the modular farms MF to a substation SS (see FIG. 17C). In one example, the clusters CL of pods of the modular farms MF can be arranged in sections to generate more energy/electricity. For example, as shown in FIG. 17C, there can be six sections of clusters CL of pods in the modular farm MF, each section generating 48 MW of power, to generate a total of 288 MW (e.g., 6×48 MW). The sections of clusters CL of pods of underwater turbines 100''' can be arranged in rows (e.g., three rows of sections, with two sections per row) which all connect to a substation SS (via their respective aggregator cables AC), as shown in FIG. 17C. Furthermore, the substation SS can connect via a shore cable SC to a shoreside connection SCC (e.g., to transfer power to an electric grid on land). Advantageously, a plurality of sections of clusters CL of pods of underwater turbines 100'''' can be arranged in rows in a farm (e.g., 5 sections of clusters CL) to generate 1.44 GW of power that is transferred to the shoreside connection SCC (see FIG. 17D). Though FIGS. 17A-17D are shown and described in connection with the underwater turbine 100'''', one of skill in the art will recognize that the underwater turbine 100 of FIGS. 1-4B, underwater turbine 100' of FIGS. 5-6, and system 100" of FIGS. 7-8 can also be operated to generate power.

Advantageously, operation of the underwater turbine 100, 100', 100", and 100''' allows continuous power generation (e.g., 24 hrs/day, 7 days/week) from a constant renewable source (e.g., ocean stream) and at a high capacity factor (e.g., 70%, 80%). Though one underwater turbine 100, 100', 100", and 100''' is described above, one of skill in the art will recognize that multiple underwater turbines 100, 100', 100", and 100''' can operate simultaneously to generate power from an underwater ocean stream (e.g., the gulf stream off the coast of Florida) and that 1 MW of power can be generated with multiple such underwater turbines 100 (e.g., with ten underwater turbines 100, each generating 100 kW of power).

Additional Embodiments

In embodiments of the present disclosure, an underwater turbine and method of operation and/or a system for generating electricity from an underwater ocean stream may be in accordance with any of the following clauses:

Clause 1. An underwater turbine system for generating electricity from an underwater ocean stream, comprising: an upper pontoon; a lower pontoon; a pylon structure extending between and interconnecting the upper pontoon and the lower pontoon; and a single propeller assembly with a plurality of blades being rotatably coupled to the lower pontoon and configured to be rotated by a force from an underwater ocean stream flowing along the lower pontoon and past the single propeller assembly, wherein the upper pontoon applies a vertical buoyant force on the lower pontoon, wherein rotation of the single propeller assembly generates electricity via a generator in the lower pontoon, and wherein the upper pontoon is configured to automatically generate a counter moment in an opposite direction to a moment generated by the rotation of the single propeller assembly to inhibit a roll motion of the underwater turbine about an axis of the lower pontoon and configured to facilitate alignment of the lower pontoon with the underwater ocean stream flowing along the lower pontoon and past the single propeller assembly.

Clause 2. The system of Clause 1, wherein the upper pontoon has a same shape and profile as the lower pontoon.

Clause 3. The system of Clause 2, wherein the upper pontoon and the lower pontoon have substantially a same length and outer diameter.

Clause 4. The system of any of Clauses 1-3, wherein the pylon structure provides a fin that inhibits a yaw motion of the underwater turbine and is configured to facilitate alignment of the lower pontoon with an underwater stream flowing along the lower pontoon and past the single propeller assembly.

Clause 5. The system of any of Clauses 1-4, wherein the lower pontoon comprises a shaft operatively coupled to the single propeller assembly and to a generator, wherein rotation of the single propeller assembly by the underwater ocean stream rotates the shaft, which rotates a rotor relative to a stator of the generator to generate electricity.

Clause 6. The system of Clause 5, wherein the lower pontoon further comprises an electric motor coupled to a shaft, which in turn is coupled to a friction winch assembly.

Clause 7. The system of Clause 6, wherein the friction winch assembly comprises a plurality of pulleys about which a cable at least partially winds, the friction winch assembly being operable to shorten or lengthen a length of the cable between the underwater turbine and a mooring weight to vertically lower or raise the underwater turbine.

Clause 8. The system of Clause 7, wherein the cable extends to a mooring weight configured to anchor the underwater turbine to a sea floor.

Clause 9. The system of any of Clauses 1-8, wherein the pylon structure includes two spaced apart legs that extend between and interconnect the upper pontoon and the lower pontoon.

Clause 10. The system of any of Clauses 1-8, wherein the pylon structure includes a plurality of connecting plates that extend between and interconnect the upper pontoon and the lower pontoon, wherein the plurality of connecting plates are arranged in an X-formation or a triangular formation about a rotating pin.

Clause 11. The system of Clause 10, wherein the rotating pin is configured to axially transfer the vertical buoyant force from the upper pontoon through the plurality of connecting plates.

Clause 12. The system of any of Clauses 1-11, wherein the upper pontoon houses a water pump operable to supply water into and drain water from within the upper pontoon to change the vertical buoyant force applied by the upper pontoon to raise or lower the underwater turbine.

Clause 13. The system of Clause 12, wherein the upper pontoon includes a first chamber and a second chamber, wherein the first chamber is operatively connected to the water pump to supply water to and drain water from the first chamber and the second chamber is operatively connected to a second water pump operable to supply water to and drain water from the second chamber, wherein filling the first chamber or the second chamber with water alters a center of the buoyant force exerted on the upper pontoon of the underwater turbine system to control a pitch of the underwater turbine system.

Clause 14. The system of any of Clauses 1-13, wherein the pylon structure includes a plurality of sheet metal plates, the plurality of sheet metal plates extending between and interconnecting the upper pontoon and the lower pontoon.

Clause 15. The system of any of Clauses 1-14, further comprising a rigid plate pivotally coupled to the lower pontoon about a pivot axis perpendicular to a longitudinal axis of the lower pontoon, wherein the rigid plate is configured to couple to a cable connected to a mooring weight, wherein a rotational orientation of the rigid plate is adjustable to align the lower pontoon with a direction of the underwater ocean stream, wherein the rigid plate is pivotable to align an intersection between the cable and the rigid plate with a longitudinal axis of the lower pontoon, and a vertical axis of the pylon structure.

Clause 16. The system of Clause 15, further comprising a piston actuatable to pivot the rigid plate about the pivot axis to counteract a pitch force exerted on the lower pontoon.

Clause 17. The system of any of Clauses 1-16, further comprising a shaft coupled to the single propeller assembly and to an electric motor generator and an electric motor, all housed within a chamber of the lower pontoon.

Clause 18. The system of Clause 17, wherein the chamber is filled with air.

Clause 19. The system of Clause 17, wherein the chamber is filled with a biodegradable oil.

Clause 20. The system of any of Clauses 1-19, further comprising a predictive artificial intelligence controller actuatable to adjust the vertical buoyant force exerted on the lower pontoon to align the lower pontoon with a desired underwater stream depth.

Clause 21. The system of any of Clauses 1-20, further comprising an artificial intelligence digital twin configured to provide remote structural monitoring of one or more of the lower pontoon, pylon structure, propeller assembly and upper pontoon.

Clause 22. An underwater turbine system for generating electricity from an underwater ocean stream, comprising: an upper pontoon; a lower pontoon; a pylon structure extending between and interconnecting the upper pontoon and the lower pontoon; a single propeller assembly with a plurality of blades being rotatably coupled to the lower pontoon and configured to be rotated by a force from an underwater ocean stream flowing along the lower pontoon and past the propeller assembly; and a cable extending between a pulley of the lower pontoon and a mooring weight configured to be located on a sea floor, wherein a buoyant force applied by the upper pontoon on the lower pontoon, a drag force applied by a stream on the lower pontoon and the propeller assembly, and a tension force applied by the cable are configured to intersect at a location centered on the lower pontoon to inhibit a pitch of the lower pontoon and to facilitate alignment of the lower pontoon with an underwater stream flowing along the lower pontoon and past the propeller assembly.

Clause 23. The system of Clause 22, wherein the upper pontoon has a same shape and profile as the lower pontoon.

Clause 24. The system of Clause 23, wherein the upper pontoon and the lower pontoon have substantially a same length and outer diameter.

Clause 25. The system of any of Clauses 22-24, wherein the pylon structure provides a fin that inhibits a yaw motion of the underwater turbine and is configured to facilitate alignment of the lower pontoon with an underwater stream flowing along the lower pontoon and past the propeller assembly.

Clause 26. The system of any of Clauses 22-25, wherein the lower pontoon comprises a shaft operatively coupled to the propeller assembly and to a generator, wherein rotation of the propeller assembly by the stream rotates the shaft, which rotates a rotor relative to a stator of the generator to generate electricity.

Clause 27. The system of Clause 26, wherein the lower pontoon further comprises an electric motor coupled to a shaft, which in turn is coupled to a friction winch assembly.

Clause 28. The system of Clause 27, wherein the friction winch assembly comprises a plurality of pulleys about which the cable at least partially winds, the friction winch assembly being operable to shorten or lengthen a length of the cable between the underwater turbine and the mooring weight to vertically lower or raise the underwater turbine.

Clause 29. The system of any of Clauses 22-28, wherein the pylon structure includes two spaced apart legs that extend between and interconnect the upper pontoon and the lower pontoon.

Clause 30. An underwater turbine system for generating electricity from an underwater ocean stream, comprising: an upper pontoon; a lower pontoon; a pylon structure extending between and interconnecting the upper pontoon and the lower pontoon; a single propeller assembly with a plurality of blades being rotatably coupled to the lower pontoon and configured to be rotated by a force from an underwater ocean stream flowing along the lower pontoon and past the propeller assembly; and a cable extending between a pulley of the lower pontoon and a mooring weight configured to be located on a sea floor, a position of the pulley being laterally adjustable in a direction parallel to an axis of the lower pontoon, wherein a buoyant force applied by the upper pontoon on the lower pontoon, a drag force applied by a stream on the lower pontoon and the propeller assembly, and a tension force applied by the cable on the pulley being configured to intersect at a location centered on the lower pontoon to inhibit a pitch of the lower pontoon and to facilitate alignment of the lower pontoon with an underwater stream flowing along the lower pontoon and past the propeller assembly, the position of the pulley being adjustable to maintain said intersection of the forces at said centered location.

Clause 31. The system of Clause 30, wherein the upper pontoon has a same shape and profile as the lower pontoon.

Clause 32. The system of Clause 31, wherein the upper pontoon and the lower pontoon have substantially a same length and outer diameter.

Clause 33. The system of any of Clauses 30-32, wherein the pylon structure provides a fin that inhibits a yaw motion of the underwater turbine and is configured to facilitate alignment of the lower pontoon with an underwater stream flowing along the lower pontoon and past the propeller assembly.

Clause 34. The system of any of Clauses 30-33, wherein the lower pontoon comprises a shaft operatively coupled to the propeller assembly and to a generator, wherein rotation of the propeller assembly by the stream rotates the shaft, which rotates a rotor relative to a stator of the generator to generate electricity.

Clause 35. The system of any of Clauses 30-34, wherein the lower pontoon further comprises an electric motor coupled to a shaft, which in turn is coupled to a friction winch assembly.

Clause 36. The system of Clause 35, wherein the friction winch assembly comprises a plurality of pulleys about which the cable at least partially winds, the friction winch assembly being operable to shorten or lengthen a length of the cable between the underwater turbine and the mooring weight to vertically lower or raise the underwater turbine.

Clause 37. A system for generating electricity from an underwater ocean stream, comprising: a plurality of underwater turbines, each comprising: an upper pontoon; a lower pontoon; a pylon structure extending between and interconnecting the upper pontoon and the lower pontoon; and a single propeller assembly with a plurality of blades being rotatably coupled to the lower pontoon and configured to be rotated by a force from an underwater ocean stream flowing along the lower pontoon and past the propeller assembly, wherein the upper pontoon applies a vertical buoyant force on the lower pontoon, wherein rotation of the propeller assembly generates electricity via a generator in the lower pontoon, and wherein the upper pontoon is configured to automatically generate a counter moment in an opposite direction to a moment generated by the rotation of the propeller assembly to inhibit a roll motion of the underwater turbine about an axis of the lower pontoon and configured to facilitate alignment of the lower pontoon with the underwater ocean stream flowing along the lower pontoon and past the propeller assembly; and a junction box operatively coupled to each of the plurality of underwater turbines via electrical cables connecting the junction box with the plurality of underwater turbines; wherein the junction box is configured to transfer the electricity generated by the plurality of underwater turbines via a power collector cable.

Clause 38. The system of Clause 37, wherein the plurality of underwater turbines are arranged in a plurality of rows.

Clause 39. The system of Clause 38, wherein the plurality of rows are parallel rows.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. An underwater turbine system for generating electricity from an underwater ocean stream, comprising:
   an upper pontoon;
   a lower pontoon;

a pylon structure extending between and interconnecting the upper pontoon and the lower pontoon; and a single propeller assembly with a plurality of blades being rotatably coupled to the lower pontoon and configured to be rotated by a force from an underwater ocean stream flowing along the lower pontoon and past the single propeller assembly, wherein the upper pontoon applies a vertical buoyant force on the lower pontoon, wherein rotation of the single propeller assembly generates electricity via a generator in the lower pontoon, and wherein the upper pontoon is configured to automatically generate a counter moment in an opposite direction to a moment generated by the rotation of the single propeller assembly to inhibit a roll motion of the underwater turbine system about an axis of the lower pontoon and configured to facilitate alignment of the lower pontoon with the underwater ocean stream flowing along the lower pontoon and past the single propeller assembly, wherein the lower pontoon comprises a shaft operatively coupled to the single propeller assembly and to the generator, wherein rotation of the single propeller assembly by the underwater ocean stream rotates the shaft, which rotates a rotor relative to a stator of the generator to generate electricity, and wherein the lower pontoon further comprises an electric motor coupled to a second shaft, which in turn is coupled to a friction winch assembly, the friction winch assembly comprises a plurality of pulleys about which a cable at least partially winds, the friction winch assembly being operable to shorten or lengthen a length of the cable that extends between the lower pontoon and a mooring weight to vertically lower or raise the underwater turbine system, the mooring weight configured to anchor the underwater turbine system to a sea floor.

2. The system of claim 1, wherein the upper pontoon has a same shape and profile as the lower pontoon, wherein the upper pontoon and the lower pontoon have substantially a same length and outer diameter.

3. The system of claim 1, wherein the pylon structure provides a fin that inhibits a yaw motion of the underwater turbine system and is configured to facilitate alignment of the lower pontoon with the underwater ocean stream flowing along the lower pontoon and past the single propeller assembly.

4. The system of claim 1, wherein the upper pontoon houses a water pump operable to supply water into and drain water from within the upper pontoon to change the vertical buoyant force applied by the upper pontoon to raise or lower the underwater turbine system.

5. The system of claim 4, wherein the upper pontoon includes a first chamber and a second chamber, wherein the first chamber is operatively connected to the water pump to supply water to and drain water from the first chamber and the second chamber is operatively connected to a second water pump operable to supply water to and drain water from the second chamber, wherein filling the first chamber or the second chamber with water alters a center of the vertical buoyant force exerted on the upper pontoon of the underwater turbine system to control a pitch of the underwater turbine system.

6. The system of claim 1, wherein the pylon structure includes a plurality of sheet metal plates, the plurality of sheet metal plates extending between and interconnecting the upper pontoon and the lower pontoon.

7. The system of claim 1, further comprising a predictive artificial intelligence controller actuatable to adjust the vertical buoyant force exerted on the lower pontoon to align the lower pontoon with a desired underwater stream depth.

8. An underwater turbine system for generating electricity from an underwater ocean stream, comprising:

an upper pontoon;

a lower pontoon;

a pylon structure extending between and interconnecting the upper pontoon and the lower pontoon; and a single propeller assembly with a plurality of blades being rotatably coupled to the lower pontoon and configured to be rotated by a force from an underwater ocean stream flowing along the lower pontoon and past the single propeller assembly, wherein the upper pontoon applies a vertical buoyant force on the lower pontoon, wherein rotation of the single propeller assembly generates electricity via a generator in the lower pontoon, and wherein the upper pontoon is configured to automatically generate a counter moment in an opposite direction to a moment generated by the rotation of the single propeller assembly to inhibit a roll motion of the underwater turbine system about an axis of the lower pontoon and configured to facilitate alignment of the lower pontoon with the underwater ocean stream flowing along the lower pontoon and past the single propeller assembly, and wherein the pylon structure includes a plurality of connecting plates that extend between and interconnect the upper pontoon and the lower pontoon, wherein the plurality of connecting plates are arranged in an X-formation or a triangular formation about a rotating pin, wherein the rotating pin is configured to axially transfer the vertical buoyant force from the upper pontoon to the lower pontoon through the plurality of connecting plates.

9. An underwater turbine system for generating electricity from an underwater ocean stream, comprising:

an upper pontoon;

a lower pontoon;

a pylon structure extending between and interconnecting the upper pontoon and the lower pontoon;

a single propeller assembly with a plurality of blades being rotatably coupled to the lower pontoon and configured to be rotated by a force from an underwater ocean stream flowing along the lower pontoon and past the single propeller assembly; and a rigid plate pivotally coupled to the lower pontoon about a pivot axis perpendicular to a longitudinal axis of the lower pontoon, wherein the rigid plate is configured to couple to a cable connected to a mooring weight, wherein a rotational orientation of the rigid plate is adjustable to align the lower pontoon with a direction of the underwater ocean stream, wherein the rigid plate is pivotable to align an intersection between the cable and the rigid plate with the longitudinal axis of the lower pontoon, and a vertical axis of the pylon structure, wherein a piston is actuatable to pivot the rigid plate about the pivot axis to counteract a pitch force exerted on the lower pontoon, wherein the upper pontoon applies a vertical buoyant force on the lower pontoon, wherein rotation of the single propeller assembly generates electricity via a generator in the lower pontoon, and wherein the upper pontoon is configured to automatically generate a counter moment in an opposite direction to a moment generated by the rotation of the single propeller assembly to inhibit a roll motion of the underwater turbine system about an axis of the lower pontoon and configured to facilitate alignment of the lower pontoon with the underwater ocean stream flowing along the lower pontoon and past the single propeller assembly.

10. An underwater turbine system for generating electricity from an underwater ocean stream, comprising:
an upper pontoon;
a lower pontoon;
a pylon structure extending between and interconnecting the upper pontoon and the lower pontoon;
a single propeller assembly with a plurality of blades being rotatably coupled to the lower pontoon and configured to be rotated by a force from the underwater ocean stream flowing along the lower pontoon and past the single propeller assembly; and
a cable extending between a pulley of the lower pontoon and a mooring weight,
wherein a buoyant force applied by the upper pontoon on the lower pontoon, a drag force applied by the underwater ocean stream on the lower pontoon and the single propeller assembly, and a tension force applied by the cable are configured to intersect at a location centered on the lower pontoon to inhibit a pitch of the lower pontoon and to facilitate alignment of the lower pontoon with the underwater ocean stream flowing along the lower pontoon and past the single propeller assembly.

11. The system of claim 10, wherein the upper pontoon has a same shape and profile as the lower pontoon, the upper pontoon and the lower pontoon have substantially a same length and outer diameter.

12. The system of claim 10, wherein the pylon structure provides a fin that inhibits a yaw motion of the underwater turbine system and is configured to facilitate alignment of the lower pontoon with the underwater ocean stream flowing along the lower pontoon and past the single propeller assembly.

13. The system of claim 10, wherein the lower pontoon comprises a shaft operatively coupled to the single propeller assembly and to a generator, wherein rotation of the single propeller assembly by the underwater ocean stream rotates the shaft, which rotates a rotor relative to a stator of the generator to generate electricity, wherein the lower pontoon further comprises an electric motor coupled to a second shaft, which in turn is coupled to a friction winch assembly, wherein the friction winch assembly comprises a plurality of pulleys about which the cable at least partially winds, the friction winch assembly being operable to shorten or lengthen a length of the cable between the lower pontoon and the mooring weight to vertically lower or raise the underwater turbine system.

14. An underwater turbine system for generating electricity from an underwater ocean stream, comprising:
an upper pontoon;
a lower pontoon;
a pylon structure extending between and interconnecting the upper pontoon and the lower pontoon;
a single propeller assembly with a plurality of blades being rotatably coupled to the lower pontoon and configured to be rotated by a force from the underwater ocean stream flowing along the lower pontoon and past the single propeller assembly; and
a cable extending between a pulley of the lower pontoon and a mooring weight configured to be located on a sea floor, a position of the pulley being laterally adjustable in a direction parallel to an axis of the lower pontoon,
wherein a buoyant force applied by the upper pontoon on the lower pontoon, a drag force applied by the underwater ocean stream on the lower pontoon and the single propeller assembly, and a tension force applied by the cable on the pulley being configured to intersect at a location centered on the lower pontoon to inhibit a pitch of the lower pontoon and to facilitate alignment of the lower pontoon with the underwater ocean stream flowing along the lower pontoon and past the single propeller assembly, the position of the pulley being adjustable to maintain said intersection of the forces at said centered location.

15. The system of claim 14, wherein the upper pontoon has a same shape and profile as the lower pontoon, the upper pontoon and the lower pontoon have substantially a same length and outer diameter.

16. The system of claim 14, wherein the pylon structure provides a fin that inhibits a yaw motion of the underwater turbine system and is configured to facilitate alignment of the lower pontoon with the underwater ocean stream flowing along the lower pontoon and past the single propeller assembly.

17. The system of claim 14, wherein the lower pontoon comprises a shaft operatively coupled to the single propeller assembly and to a generator, wherein rotation of the single propeller assembly by the underwater ocean stream rotates the shaft, which rotates a rotor relative to a stator of the generator to generate electricity, wherein the lower pontoon further comprises an electric motor coupled to the shaft, which in turn is coupled to a friction winch assembly, wherein the friction winch assembly comprises a plurality of pulleys about which the cable at least partially winds, the friction winch assembly being operable to shorten or lengthen a length of the cable between the lower pontoon and the mooring weight to vertically lower or raise the underwater turbine system.

* * * * *